United States Patent
Fells et al.

(10) Patent No.: US 11,442,323 B2
(45) Date of Patent: Sep. 13, 2022

(54) LIQUID CRYSTAL MODULATOR

(71) Applicant: Oxford University Innovation Limited, Oxford (GB)

(72) Inventors: Julian Fells, Oxford (GB); Steve Elston, Oxford (GB); Martin Booth, Oxford (GB); Patrick Salter, Oxford (GB); Stephen Morris, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 17/252,359

(22) PCT Filed: Jun. 21, 2019

(86) PCT No.: PCT/GB2019/051743
§ 371 (c)(1),
(2) Date: Dec. 15, 2020

(87) PCT Pub. No.: WO2020/002881
PCT Pub. Date: Jan. 2, 2020

(65) Prior Publication Data
US 2021/0263358 A1    Aug. 26, 2021

(30) Foreign Application Priority Data
Jun. 28, 2018   (GB) ..................... 1810633

(51) Int. Cl.
*G02F 1/139*    (2006.01)
*G02F 1/13363*    (2006.01)
(Continued)

(52) U.S. Cl.
CPC .......... *G02F 1/1393* (2013.01); *G02F 1/1337* (2013.01); *G02F 1/13439* (2013.01);
(Continued)

(58) Field of Classification Search
CPC ............ G02F 1/1393; G02F 1/133633; G02F 1/133541; G02F 1/133553
See application file for complete search history.

(56) References Cited

U.S. PATENT DOCUMENTS 5,238,435 A * 8/1993 Te Velde ................... H01J 9/00
                                                                    445/24
5,384,067 A * 1/1995 Doane .................. C09K 19/586
                                                                    349/183
(Continued)

FOREIGN PATENT DOCUMENTS

WO        2018/060497 A1    4/2018

OTHER PUBLICATIONS

Translation of TW496984B (Year: 1999).*
(Continued)

*Primary Examiner* — Lucy P Chien
(74) *Attorney, Agent, or Firm* — Thomas|Horstemeyer, LLP

(57) ABSTRACT

A device for modulation of light (16) having a wavelength, comprising: a first substrate (10) with a first face (81) and a second opposite face (82), and comprising a first electrode (11); a second substrate (20) adjacent to the second face (82) and defining a gap between the first and second substrate (10, 20), the second substrate (20) comprising a second electrode (21); a responsive liquid crystal layer (15) disposed in the gap, wherein the responsive liquid crystal layer (15) has a flexoelectro-optic chiral nematic phase, and is birefringent with an optic axis that tilts in response to an applied electric field between the first and second electrode (11, 21); and a mirror adjacent to the second substrate (20), the mirror configured to reflect incident circular polarised light while preserving its handedness.

20 Claims, 16 Drawing Sheets

(51) Int. Cl.
   *G02F 1/1335* (2006.01)
   *G02F 1/1337* (2006.01)
   *G02F 1/1343* (2006.01)

(52) U.S. Cl.
   CPC .. *G02F 1/133541* (2021.01); *G02F 1/133553* (2013.01); *G02F 1/133633* (2021.01); *G02F 1/133638* (2021.01); *G02F 2201/343* (2013.01); *G02F 2203/01* (2013.01); *G02F 2203/12* (2013.01); *G02F 2203/18* (2013.01); *G02F 2203/50* (2013.01)

(56) References Cited

U.S. PATENT DOCUMENTS

| | | |
|---|---|---|
| 2001/0052961 A1 | 12/2001 | Towler et al. |
| 2007/0278448 A1* | 12/2007 | Chari ................ C09K 19/0225 252/299.01 |
| 2008/0267039 A1* | 10/2008 | Horinouchi .......... G11B 7/1381 369/103 |
| 2010/0051194 A1 | 3/2010 | Chien et al. |
| 2011/0141385 A1* | 6/2011 | Lee et al. ............. G02F 1/1335 349/33 |
| 2013/0044147 A1* | 2/2013 | Kim ..................... G09G 3/3426 345/697 |
| 2020/0033672 A1 | 1/2020 | Leister et al. |

OTHER PUBLICATIONS

WO 2010032594 A1 (Year: 2008).*
WO0229484A2 (Year: 2000).*
WO 85/04023 (Year: 1985).*
International Search Report and Written Opinion for PCT/GB2019/051743, dated Oct. 29, 2019, pp. 1-19.
Chun-Ta Wang et al: Bistable reflective polarizer-free optical switch based on dye-doped cholesteric liquid crystal Nov. 3, 2011 (Nov. 3, 2011), pp. 17-21.

* cited by examiner

LIQUID CRYSTAL MODULATOR

CROSS-REFERENCE TO RELATED APPLICATIONS

This application is the National Stage of International Application No. PCT/GB2019/051743, filed Jun. 21, 2019, which claims priority to GB 1810633.6, filed Jun. 28, 2018, which are entirely incorporated herein by reference.

FIELD OF THE INVENTION

The present invention relates to a phase modulator, and more particularly to a spatial light modulator comprising a liquid crystal material

BACKGROUND

Phase modulators modulate the phase of a light beam. Spatial light modulators are devices that allow a light beam to be modulated (e.g. in phase) in a way that varies spatially.

Devices which allow optical phase to be manipulated over a two-dimensional area have applications in holography [1], biomedical imaging [2], laser micromachining [3], free-space optical communication [4], beam steering and many other fields. Liquid crystal (LC) spatial light modulators (SLMs) are attractive components to perform this function because they can be manufactured at relatively low cost and offer high spatial resolution. They are typically used in a reflective configuration; the reflector being divided up into an array of pixels, each one independently electrically controlled via a silicon backplane. For many applications it is necessary or desirable to have full analogue control over a $2\pi$ phase range for each pixel. Planar aligned nematic LC SLMs are able to provide multi-level phase modulation, however, existing devices are limited to frame rates below 100 Hz. Ferroelectric LC devices, on the other hand, give much faster frame rates, but they are typically only suitable for binary phase modulation because of their bi-stable nature [5]. However, a chiral-smectic ferroelectric device has been used to demonstrate a $1.96\pi$ phase range at 1 kHz, but with high nonlinearity in the response and a steep transition with voltage [6].

A device that can simultaneously deliver both analogue phase modulation and a fast frame rate has the potential to enhance the performance of existing applications, as well as opening up new possibilities. Recently, an antiferroelectric LC phase modulator was demonstrated to be capable of $2\pi$ phase modulation with <300 μs response time [7]. However, this required a relatively thick device, of the order of 50 μm. In practice, it is desirable to keep SLM devices thin, to enable a small pixel pitch and therefore greater spatial resolution, and to ensure a low drive voltage is required. Phase modulators based on other LC mesophases such as the blue phase, as well as the uniform standing helix (USH) and uniform lying helix (ULH) in the chiral nematic LC phase have also been investigated [8].

LC phase modulators based on the flexoelectro-optic effect [9] in chiral nematic LCs in the ULH mode have been proposed previously and demonstrated to give a phase modulation range of $0.71\pi$ at 500 Hz and $0.52\pi$ at 1 kHz [10]. While fast, the low phase modulation range will be insufficient for many applications.

It would be preferable to have analogue phase modulation with minimal accompanying amplitude modulation. A high-speed phase modulator capable of analogue operation with a large modulation range is desirable.

SUMMARY OF THE INVENTION

According to a first aspect of the invention, there is provided a device for modulation of light, comprising:
  a first substrate with a first face and a second opposite face, and comprising a first electrode;
  a second substrate adjacent to the second face and defining a gap between the first and second substrate, the second substrate comprising a second electrode;
  a responsive liquid crystal layer disposed in the gap, wherein the responsive liquid crystal layer has a flexo-electro-optic chiral nematic phase, and is birefringent with an optic axis that tilts in response to an applied electric field between the first and second electrode.

The device (according to any aspect disclosed herein) may comprise a circular polariser between a source of the light to be modulated and the first face. Alternatively the source of the light to be modulated by the device may be configured to emit circularly polarised light.

The electric field may comprise a field vector that is perpendicular to a helix axis of the first liquid crystal layer.

The device may further comprise a constrained liquid crystal layer that has a fixed optic axis (i.e. the optical axis not being responsive to an applied field), or which has an optic axis that is less responsive to an applied field than the responsive liquid crystal layer (i.e. tilts less).

The first and second substrate may be substantially parallel to one another.

The responsive liquid crystal layer may have a helix axis in a plane substantially parallel to the substrates and may be in the uniform lying helix mode.

The first and second electrodes may be respectively on inside surfaces of the first and second substrates.

The electrodes may be configured to generate an electric field which is substantially perpendicular to a plane of the first and/or second substrate.

The tilt of the responsive liquid crystal layer may be in a plane parallel to the first and/or second substrate.

According to a second aspect of the invention, there is provided a device for modulation of light, comprising:
  a first substrate comprising a first electrode;
  a second substrate adjacent to the first substrate and defining a gap between the first and second substrate, the second substrate comprising a second electrode;
  a liquid crystal layer disposed in the gap, wherein the first liquid crystal layer is birefringent with an optic axis that tilts in response to an applied electric field between the first and second electrode;
  a further liquid crystal layer disposed in the gap with an optic axis that responds differently than that of the liquid crystal layer to an applied electric field.

The liquid crystal layer may be a first responsive liquid crystal layer. The further liquid crystal layer may be a constrained liquid crystal layer (e.g. with no tilt in response to the applied electric field) or a second responsive liquid crystal layer. The first and second responsive liquid crystal layers may have opposite chiral handedness.

According to a third aspect of the invention, there is provided a device for modulation of light, comprising:
  a first substrate comprising a first electrode;
  a second substrate adjacent to the first substrate and defining a gap between the first and second substrate, the second substrate comprising a second electrode;

a responsive liquid crystal layer disposed in the gap, wherein the responsive liquid crystal layer is birefringent with an optic axis that tilts in response to an applied electric field between the first and second electrode;

a constrained liquid crystal layer disposed in the gap with an optic axis that is either fixed with varying electric field, or which responds to an applied electric field by tilting less than the optic axis of the first liquid crystal layer.

The constrained layer may be a planar layer, and the optic axis of the constrained layer may be substantially parallel to the plane of the constrained layer when no electric field is applied.

The constrained liquid crystal layer may have a flexoelectro-optic chiral nematic phase.

Optional features defined below are applicable to any aspect. The features of each aspect can be combined with those of any other aspect.

The device may be configured to modulate the phase of the light in an analogue manner (or with at least 6-bit resolution, preferably at least 8-bit resolution) over a range of at least $\pi$, preferably $2\pi$. This broad range of phase modulation is preferably accompanied by less than 20% (or less than 10% or less than 5%) of amplitude modulation over the range of phase modulation.

The constrained liquid crystal layer is preferably a polymerised liquid crystal layer or a liquid crystal polymer or a cholesteric liquid crystal glass.

The constrained liquid crystal layer may be configured as a quarter wave plate or with a phase retardance of 90 degrees (e.g. 70-110 degrees). The responsive liquid crystal layer may be configured as a half-wave plate with w nominal retardance of 180 degrees (e.g. 160-180 degrees).

The circular polariser may comprise the constrained liquid crystal layer.

According to a fourth aspect, there is provided a device for modulation of light, comprising:
  a first substrate comprising a first electrode;
  a second substrate adjacent to the first substrate and defining a gap between the first and second substrate, the second substrate comprising a second electrode;
  a responsive liquid crystal layer disposed in the gap, wherein the responsive first liquid crystal layer has a flexoelectro-optic chiral nematic phase, and is birefringent with an optic axis that tilts in response to an applied electric field between the first and second electrode;
  wherein the device is for modulation of light reflected therefrom, and the device further comprises:
  a mirror adjacent to the second substrate, the mirror configured to reflect incident circular polarised light while preserving its handedness.

The device according to the fourth aspect may comprise any of the optional features described with reference to the first aspect, second or third aspect.

The mirror optionally comprises: a quarter wave plate (or a plate configured to impart substantially 90 degrees of phase retardance) and a reflector; or a chiral nematic/cholesteric reflector. The chiral nematic/cholesteric reflector may be in the uniform standing helix mode. The chiral nematic/cholesteric reflector may be polymerised and may be in a film. The cholesteric reflector layer may consist of cholesteric particles to avoid the angular dependence.

The device may further comprise a reflector adjacent to the second substrate, and the constrained liquid crystal layer is between the responsive liquid crystal layer and the reflector.

The constrained liquid crystal layer may be a first constrained liquid crystal layer, and the circular polariser may comprise a second constrained liquid crystal layer (with an optic axis that is either fixed with varying electric field, or which responds to an applied electric field by tilting less than the optic axis of the responsive crystal layer).

The second electrode may be reflective, and/or the second electrode may be reflective and the mirror may comprise the reflective second electrode.

The device may be for phase modulation of light transmitted through the device.

The responsive liquid crystal layer may be a first responsive liquid crystal layer, and the device may further comprise a second responsive liquid crystal layer, wherein the second responsive liquid crystal layer has a flexoelectro-optic chiral nematic phase, and is birefringent with an optic axis that tilts in response to an applied electric field across the thickness of the layer.

The first responsive liquid crystal layer may have an opposite chiral handedness to the second responsive liquid crystal layer.

The device may further comprise a half wave plate (or a plate with a phase retardance of between 140 and 220 degrees) between the first and second responsive liquid crystal layers.

A biasing circuit may be provided configured to control a first electric field applied across the first responsive liquid crystal layer and a second field applied across the second responsive liquid crystal layer. The first field may have an opposite polarity to the second field.

The (first and/or second) responsive liquid crystal layer may (each) have a thickness equivalent to a retardation of 0.4 to 0.6 wavelengths or a phase retardation of between 140 and 220 degrees.

The first substrate may comprise a first alignment layer, and the second substrate may comprise a second alignment layer (for aligning the liquid crystal mesophase of the responsive liquid crystal layer).

The first alignment layer may be configured to act as a quarter wave plate, and/or the second alignment layer may be configured to act as a quarter wave plate (e.g. with a phase retardance of between 80 and 100 degrees).

According to a fifth aspect, there is provided a spatial light modulator comprising an array of devices according to any of the preceding aspects, wherein the spatial light modulator is configured for independent control of the modulation of each device in the array.

The devices in the array may be in a plane.

Each device may have at least one of: a common first substrate, a common second substrate, and a common responsive liquid crystal layer.

The second substrate may comprise an integrated electronic circuit configured to independently control the electric field applied to each device in the array.

The first electrode may be a common electrode, and each device in the array may comprise an independent second electrode.

According to a sixth aspect, there is provided a method of producing a device for light modulation, comprising:
  filling a gap in a cell with a polymerisable/crosslinkable liquid crystal composition, the cell comprising a first substrate and a second substrate defining the gap therebetween;

polymerising/crosslinking a portion of the polymerisable/crosslinkable liquid crystal composition in the gap, to produce a polymerised/crosslinking liquid crystal layer with a constrained director profile or with a director profile with reduced response to applied electric field;

retaining a responsive liquid crystal layer in contact with the polymerised liquid crystal layer, the responsive liquid crystal layer having a flexoelectro-optic chiral nematic phase, and being birefringent with an optic axis that tilts in response to an applied electric field in the responsive liquid crystal layer.

The responsive liquid crystal layer may comprise the same polymerisable liquid crystal composition as the polymerised liquid crystal layer.

Polymerising a portion of the polymerisable liquid crystal composition in the gap may comprise focusing a beam of light through the first substrate to polymerise a portion of the polymerisable liquid crystal material.

The polymerised liquid crystal layer may comprise a different liquid crystal composition to the responsive liquid crystal layer, and the method may further comprise:

removing any polymerisable liquid crystal material that has not been polymerised after the polymerising step;

refilling the gap with a different liquid crystal composition.

Polymerising the liquid crystal material may comprise illuminating the gap through the second substrate, and the method may further comprise:

detaching the polymerised liquid crystal layer from the second substrate, attaching the polymerised liquid crystal layer to a replacement second substrate (which may be a silicon backplane), filling a gap between the polymerised liquid crystal layer and a first substrate to provide the responsive liquid crystal layer.

The responsive liquid crystal material may be photoaligned. The responsive liquid crystal mode may be polymerised to hold the alignment, whilst still allowing the optic-axis to tilt. The constrained layer may have tilting of the optic-axis under applied field, but to a lesser extent than the responsive layer. The degree to which the optic-axis tilts with applied field may be less than without polymerisation, but greater than the fixed layer. There may be a difference in the degree to which the optic axis tilts with field between the responsive and fixed layers.

According to a seventh aspect, there is provided a method of controlling a device or spatial light modulator according to any of the preceding aspects, comprising:

determining a desired modulation level for the device;

selecting a control voltage between the first and second electrode corresponding with the desired modulation level;

prior to applying the control voltage between the first and second electrode, applying a voltage between the first and second electrode corresponding with a predetermined electric field, applying the control voltage between the first and second electrode.

There may be imaging optics to ensure that reflected light passes back through the same pixels in reflective devices.

The mirror may comprise:

a spray/spin/etc. deposit chiral polymer LC, a cast chiral polymer LC, a printed (e.g. inkjet printed) chiral LC, a grown chiral LC layer, a biologically-inspired chiral reflector (e.g. using DNA or mimicking beetles), a variation on a chiral reflector (e.g. glancing angle deposition of inorganic layers), a cholesteric glass, a chiral reflector formed using chiral templating, a crystalline chiral reflector formed using direct laser writing, a cholesteric cellulose nanocrystal, a layer comprised of cholesteric particles for angle independence, a quarter-wave plate with a mirror, a quarter-wave plate bonded to a mirror.

The reflector could comprise: a metal, a dielectric stack, an organic or inorganic material.

Any of the quarter-wave plates may comprise:

a quarter-wave plate with photo-alignment;

an inorganic quarter wave plate;

a nematic polymer quarter-wave plate;

an elastomer quarter wave plate; or a non-LC polymer quarter wave plate.

The devices can have integrated wave plates or external wave plates. The devices can have modifications to wave plates to correct for errors elsewhere in the system. Waveplates may have a retardance error from their ideal/nominal retardance. The polarisers described herein may be integrated. A device according to an embodiment may be designed for an input polarisation other than linear, for example circular: in this case it would not be necessary to have the polariser and quarter-wave plate at the front. The waveplates may be zero order or multiple order. The waveplates may be achromatic.

Multiple devices may be concatenated together in different arrangements. For example, transmissive devices can be directly concatenated, and reflective devices can be concatenated using polarising, non-polarising and circularly polarising beamsplitters.

Although a device has been described that uses a ULH mode, this is not essential, and in some embodiments of any aspect, an LC layer with a different phase may be used, such as USH chiral nematic LC with in-plane electrodes, a nematic LC with in-plane electrodes twisted nematic with in-plane electrodes, biaxial LC, twisted smectic C, antiferroelectric.

DETAILED DESCRIPTION

Embodiments of the invention will now be described, with reference to the accompanying drawings, in which:

FIG. 7 shows measured transient response of tilt angle vs time for various applied voltages for an example device according to FIG. 5a;

FIG. 9 shows measurements of phase and amplitude for a device in accordance with FIG. 5a;

FIG. 11 is a schematic cross-sectional diagram of a device in accordance with FIG. 5a;

Figure 5:
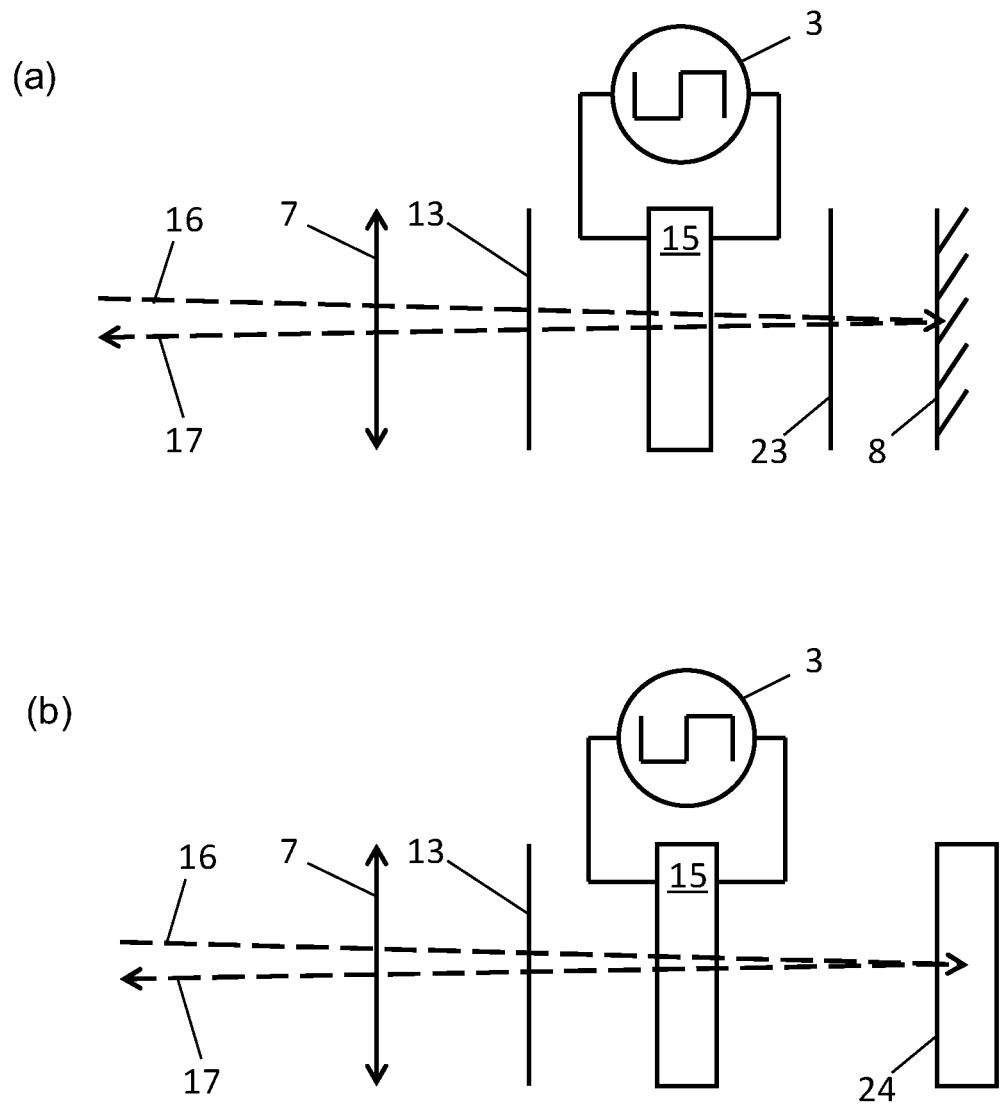
FIG. 5a is a schematic of a reflective device according to an embodiment, in which a circular polariser is disposed between the incoming light and a liquid crystal layer with a half wave retardance, and a quarter wave plate is disposed between the liquid crystal layer and a reflector.
FIG. 5b is a schematic of a reflective device according to an embodiment, in which a circular polariser is disposed between the incoming light and a liquid crystal layer with a half wave retardance, and a chiral nematic reflector is disposed to reflect light (and perform a substantially equivalent job to the quarter wave plate and reflector in FIG. 5a)
Figure 17:
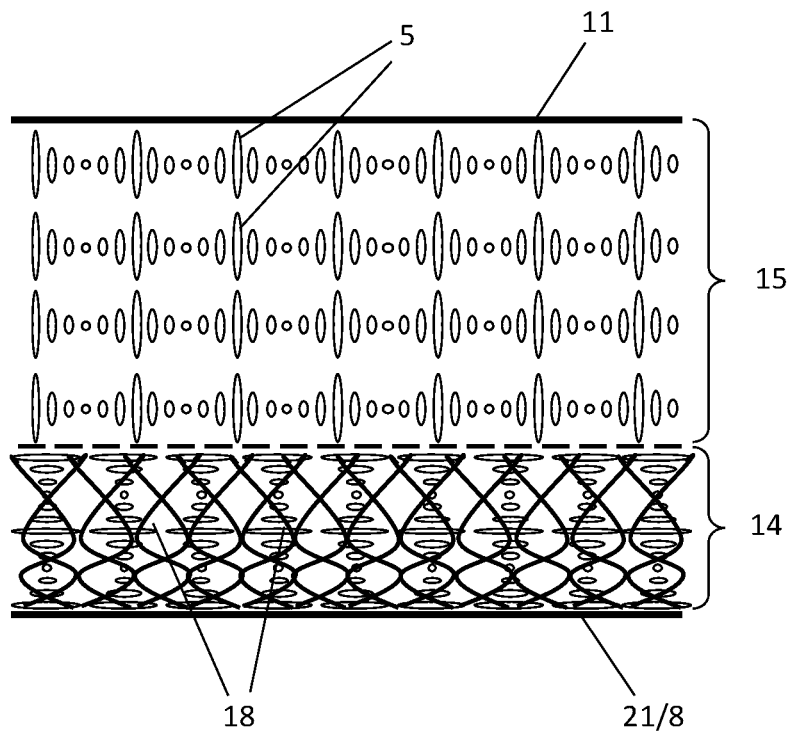
Figure 18:
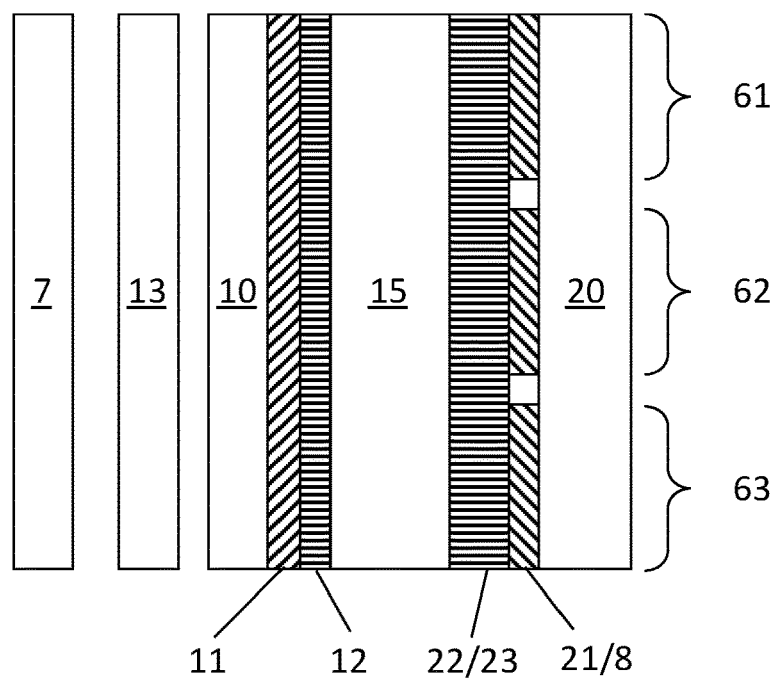
Figure 19A:
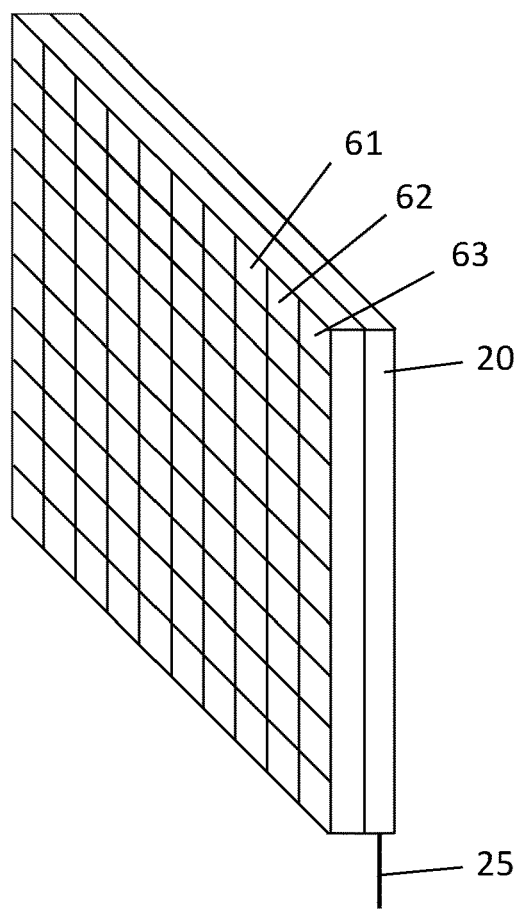
Figure 19B:
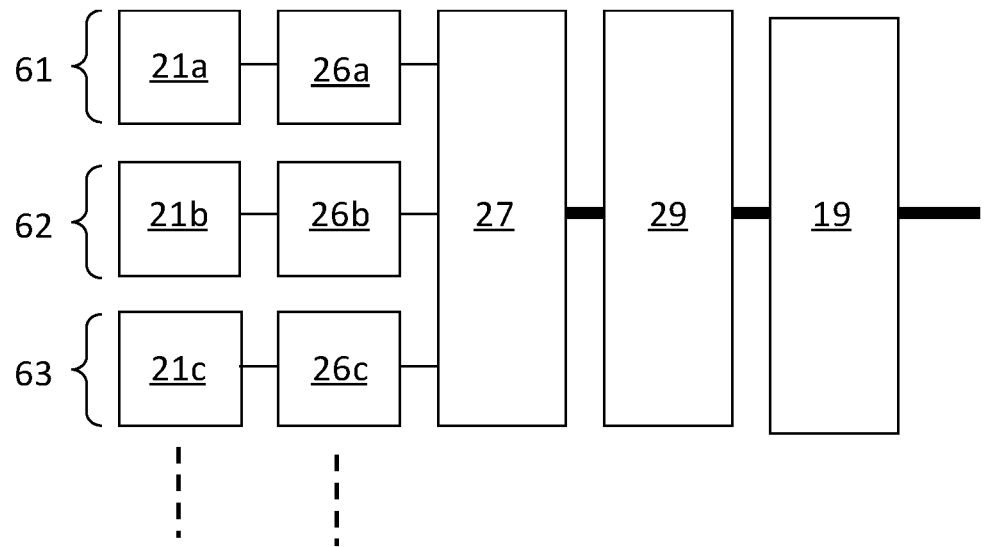
Figure 20:
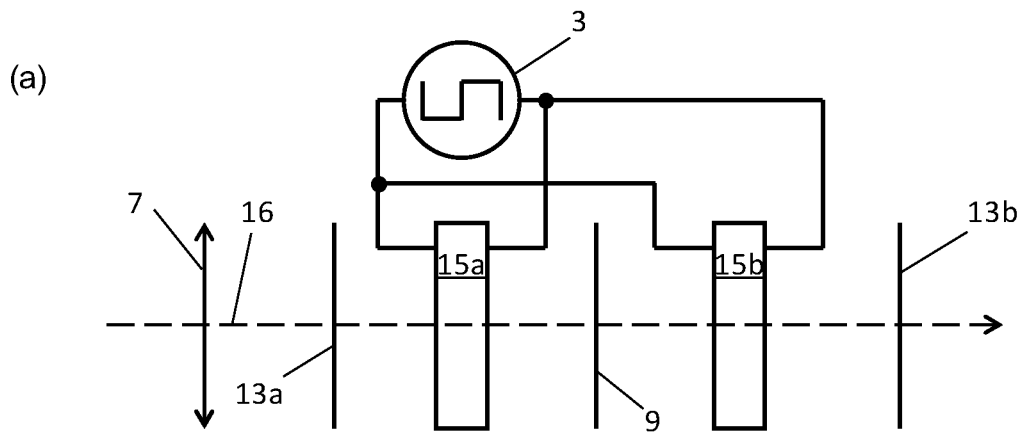
Figure 20:
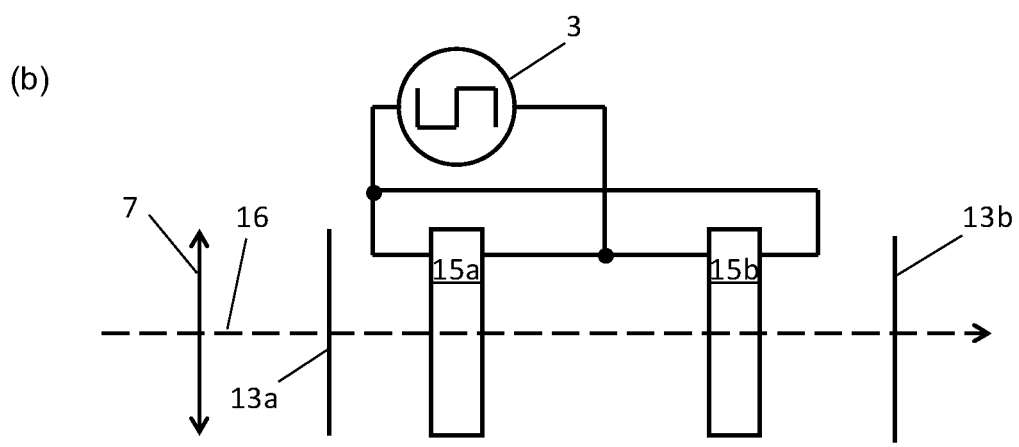
Figure 21:
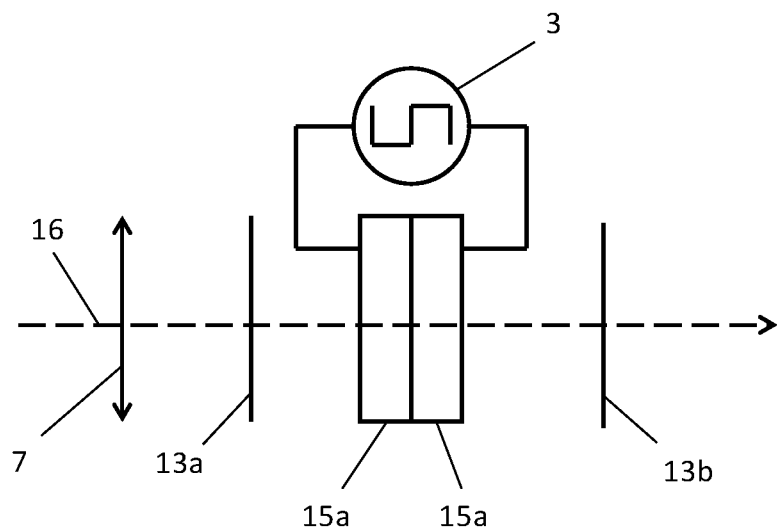
Figure 22:
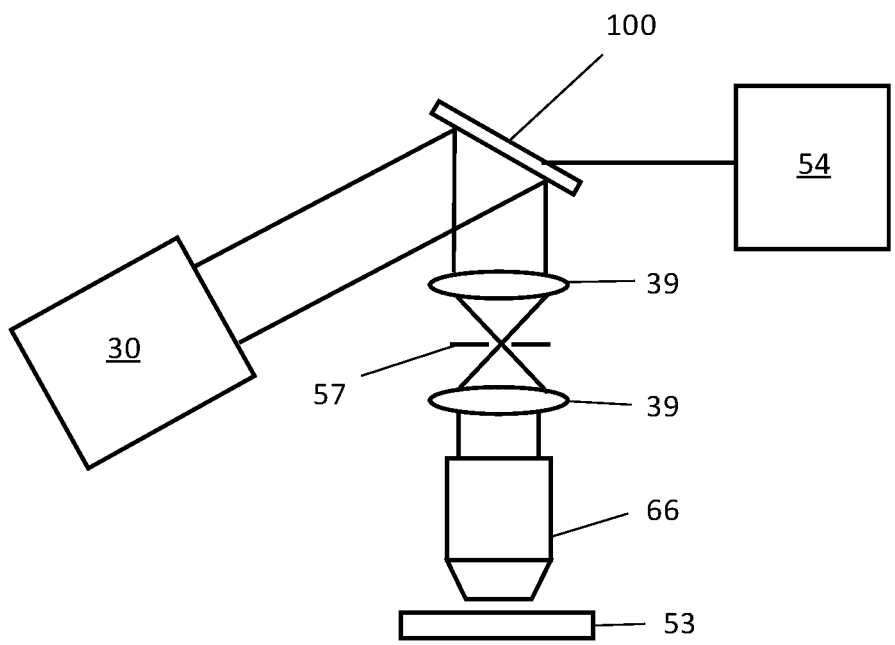
Figure 23:
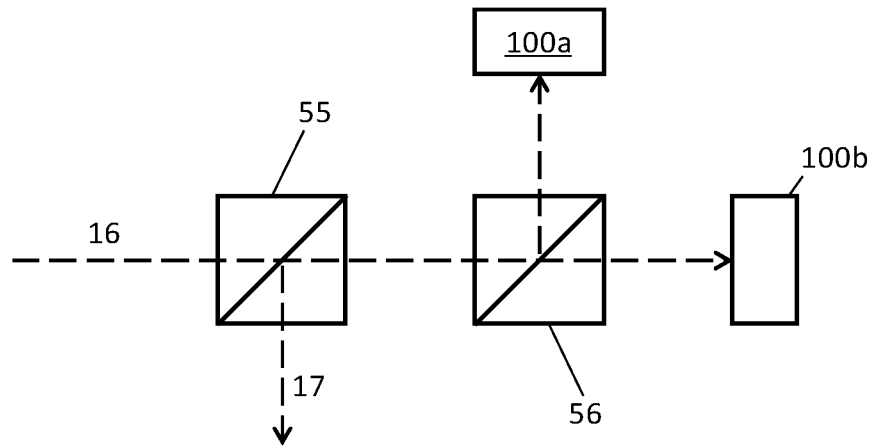
Figure 24A:
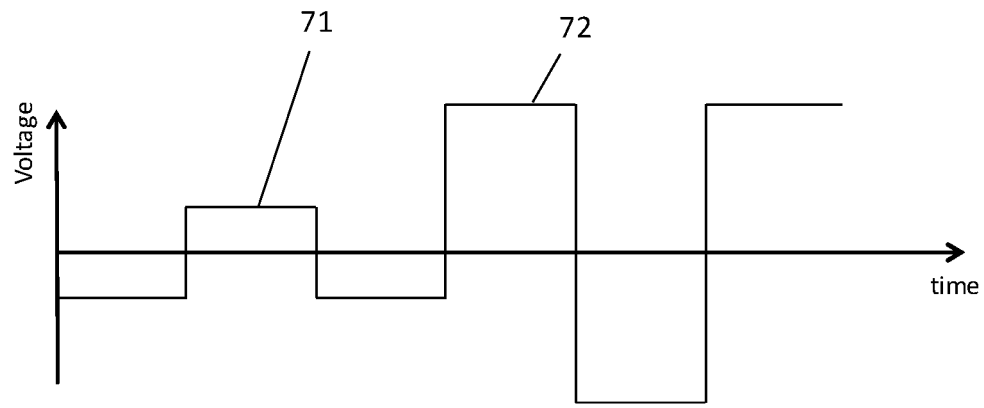
Figure 24B:
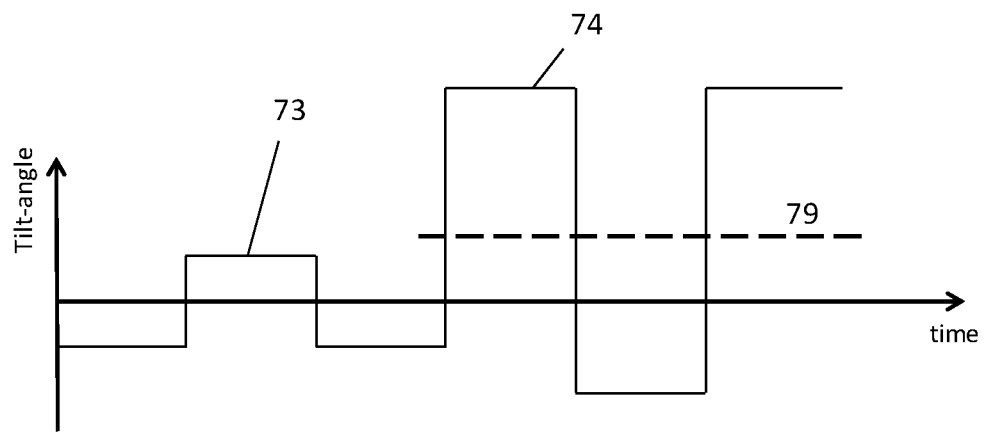
Figure 25A:
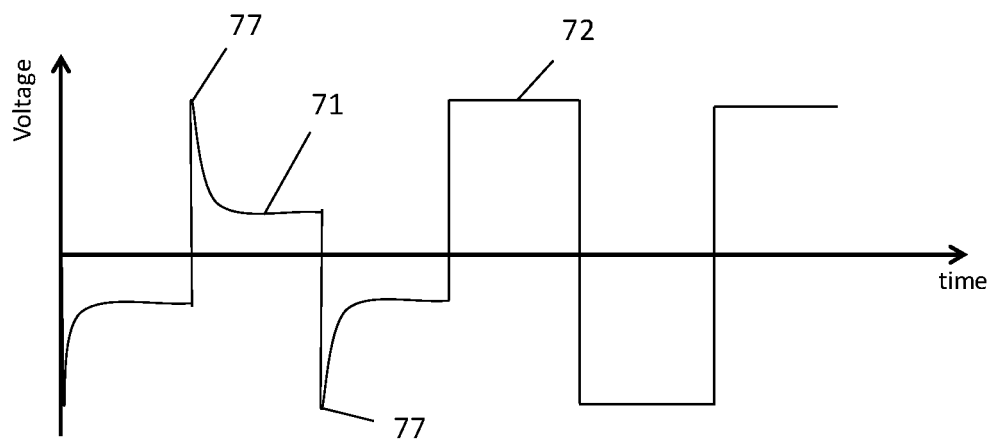
Figure 25B:
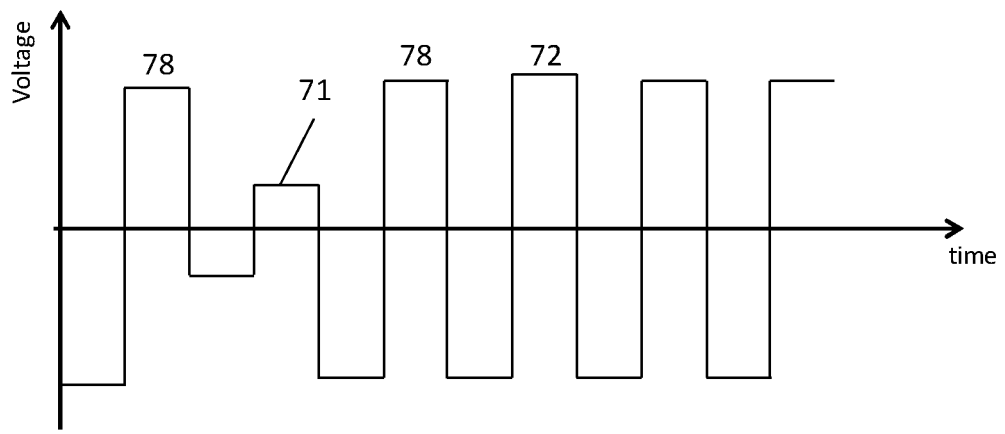

FIG. 17 a further schematic cross-section of liquid crystal layers between a first and second electrode, showing a polymerised chiral nematic reflector adjacent to the second (lower) electrode and a responsive ULH liquid crystal layer adjacent to the first (upper) electrode;

FIG. 18 is a schematic cross-sectional diagram of a device in accordance with FIG. 5a in which an alignment layer is configured to act as a quarter wave plate;

FIG. 19a is a schematic of a 2-dimensional array of pixels/devices in accordance with an embodiment;

FIG. 19b is a block diagram of a controller for controlling the pixels/devices of FIG. 19a;

FIG. 20a is a schematic of a transmissive device according to an embodiment, corresponding with a back to back concatenation of two devices in accordance with FIG. 5a (excluding the mirror);

FIG. 20b is a schematic of a transmissive device according to an embodiment, in which there is a first and a second responsive liquid crystal layer, and opposite electric fields are applied to the first and second responsive liquid crystal layers so that they tilt in opposite directions to produce an additive phase modulation;

FIG. 21 is a schematic of a transmissive device according to an embodiment, in which there is a first and a second responsive liquid crystal layer with opposite chiral handedness, so that they produce an additive phase modulation when biased with the same polarity electric field;

FIG. 22 is an optical system comprising a spatial light modulator in accordance with an embodiment, in which a spatial light modulator is used to pre-distort a wave-front to correct for aberration in focusing on a sample/workpiece;

FIG. 23 shows a polarisation independent spatial light modulator obtained by combining two spatial light modulators, one for horizontally polarised light, and the other for vertically polarised light;

FIG. 24a is a graph showing a set of voltage levels applied over time, each voltage corresponding with a desired tilt angle and associated phase modulation;

FIG. 24b is a graph showing the tilt angle resulting from the voltages in FIG. 24a, illustrating that a high voltage signal can result in a subsequent offset of the mean optic axis angle, potentially resulting in errors in phase modulation; and FIGS. 25a and 25b are graphs illustrating a solution to the problem illustrated in FIG. 24b, in which voltages corresponding with desired tilt angles are interleaved with high voltage signals which maintain a specific offset of the mean optic axis angle, with FIG. 25a using a high voltage pulse that decays to a desired set voltage, and FIG. 25b using a separate high voltage pulse interleaved with the desired set voltage pulse.

The applicant has identified that in prior art liquid crystal based light modulators, phase modulation is accompanied by significant amplitude modulation. Prior art references [6] and [10] do not provide any measurement results of the amplitude response.

In prior art devices that use a ULH liquid crystal layer [10], the phase change is of limited range, and is accompanied by significant amplitude modulation (as will be discussed more fully below, with reference to FIG. 3).

FIG. 1 shows a liquid crystal cell, comprising a first substrate 10, second substrate 20 and liquid crystal layer 15. The first and second substrate 10, 20 are spaced apart to define a gap, in which the liquid crystal layer 15 is disposed. The first and second substrate 10, 20 respectively further comprise first and second electrodes 11, 21 and first and second alignment layers 12, 22.

The alignment layers 12, 22 are configured to control the alignment of liquid crystal molecules in contact therewith. The first and second electrodes 11, 21 are arranged to allow an electric field $E_A$, 4, to be applied across the gap, for example by grounding the first electrode 11 and applying a voltage source 3 to the second electrode 21.

Figure 1A:
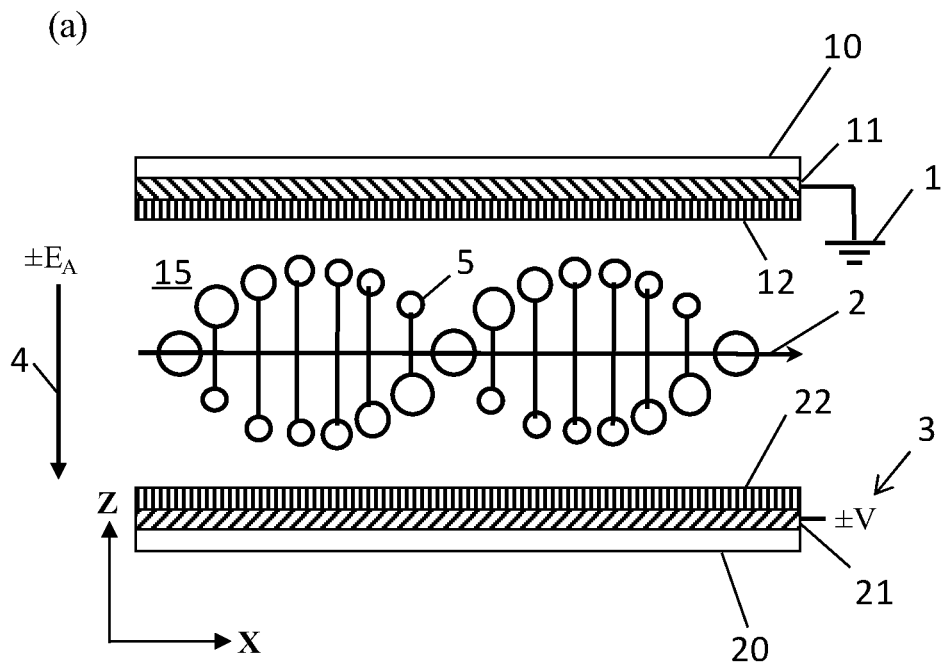
FIG. 1a is a schematic of a device according to an embodiment, illustrating a liquid crystal in the uniform lying helix (ULH) mode.
Figure 1B:
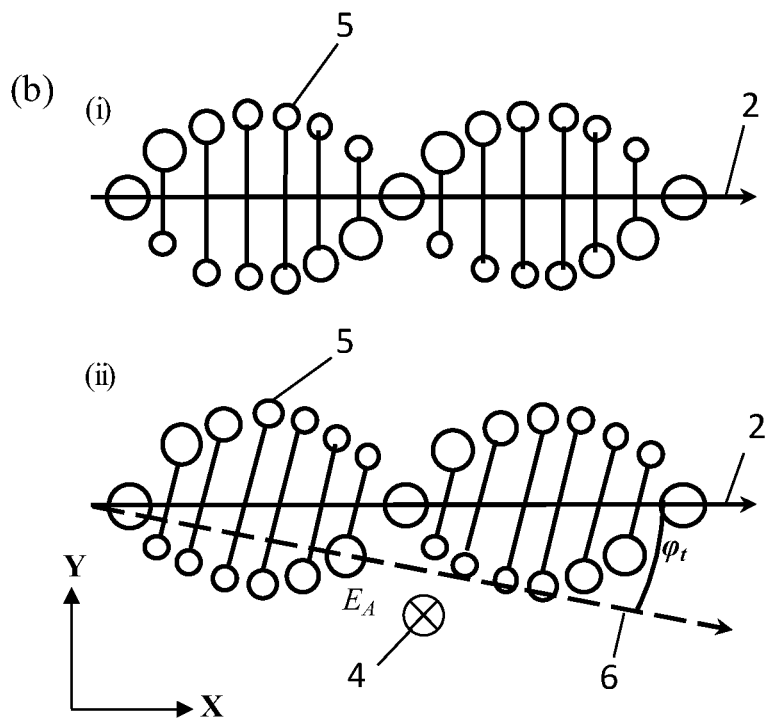
FIG. 1b illustrates the optic axis with (i) no electric field applied, and (ii) with an electric field applied.

The liquid crystal layer 15 has a flexoelectro-optic chiral nematic LC phase. In the example of FIG. 1a, the liquid crystal layer 15 has a ULH mode, in which the molecules 5 of the LC form a macroscopic helical structure (as shown in FIGS. 1a and 1b), with a helix axis 2 that is in the plane of the device (i.e. parallel with the first and second substrates 10, 20 and perpendicular to the gap between the first and second substrate 10, 20). The LC layer 15 is birefringent with an optic-axis in the plane of the device. As shown in FIG. 1b, when an electric field is applied across the LC layer 15, the coupling between the applied electric field 4 and the field-induced flexoelectric polarisation leads to a bend-splay distortion. This results in a macroscopic rotation/angle (tilt) $\varphi_t$ in the optic axis 6 within the plane. The LC layer 15 may be modelled as a wave-plate with an optic-axis 6 in a plane normal to the direction of propagation of an incident beam, whereby the angle ($\varphi_t$) changes with the amplitude of the applied field (and hence voltage). The direction of the tilt is determined by the polarity of the applied field.

The chiral nematic LC may comprise a nematic LC with a high twisting power chiral dopant (e.g. BDH1281), or may comprise an LC which is inherently chiral. For example, the LC could be a bimesogen/dimer such as CBC7CB (alternatively CBC9CB, CBC11CB, CBC5CB) with chiral dopant of 3 wt % BDH1281. It is desirable to select a concentration of chiral dopant such that the helical pitch is less than 300 nm to obtain a fast flexoelectro-optic response time.

To obtain a ULH mode the LC may be cooled from an isotropic phase in the presence of an applied electric field, with pressure applied. The first substrate 10 is transparent (e.g. comprising glass), and the second substrate 20 may be non-transparent (e.g. comprising silicon). The second substrate 20 preferably serves as a backplane, controlling the field across the LC layer 15. The first electrode 11 (on the inside of the first substrate 10) is transparent, for example comprising ITO (indium tin oxide). The second electrode 21 (on the inside of the second substrate 20) may be reflective (e.g. aluminium). The alignment layers 12, 22 (between the electrodes 11, 21 and the LC layer 15) may comprise polyimide, but any other suitable material can be used.

Incoming light enters via the first substrate 10, passes through the LC layer 15, is reflected by the second electrode 21, and passes back out through the LC layer 15 and first substrate 10.

Figure 2:
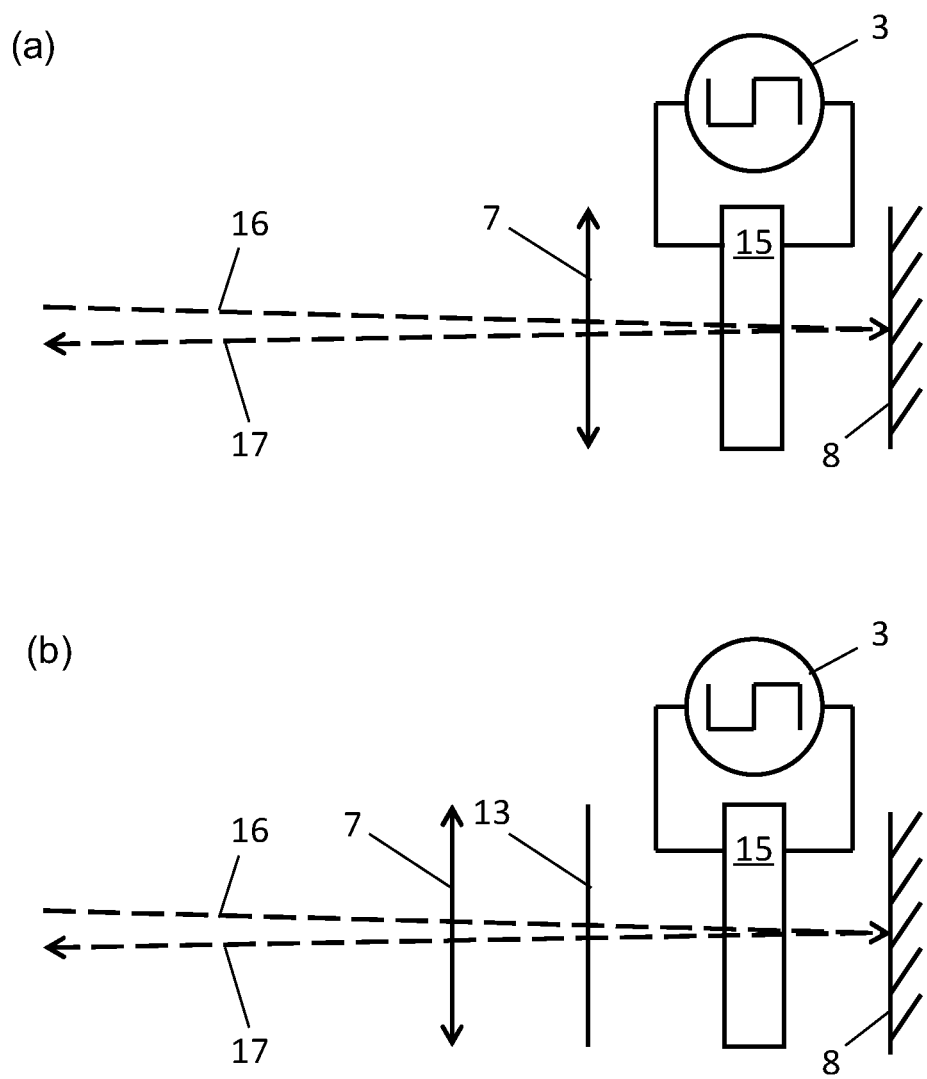
FIG. 2a is a schematic of a device in which a liquid crystal layer is used to modulate light after it has been linearly polarised.
FIG. 2b is a schematic of a device according to an embodiment, wherein a circular polariser is disposed such that a liquid crystal layer with a quarter wavelength retardance receives circular polarised light.

FIG. 2a shows a phase modulator like that of Chen [10], but with a linear polariser 7 in front of the LC layer 15. The linear polariser 7 and reflector 8 are disposed on either side of the LC layer 15. The liquid crystal layer 15 comprises a flexoelectro-optic chiral nematic phase with a retardance of $\lambda/4$ to $\lambda/2$ (equivalent to a retardance range of $\pi/2$ to $\pi$ rad). A voltage source 3 is provided to control the tilt angle of the LC layer. Incident light 16 passes through the linear polariser 7, through the LC layer 15, and reflects from the mirror 8 to pass back through the LC layer 15 and the linear polariser 7.

Figure 3:
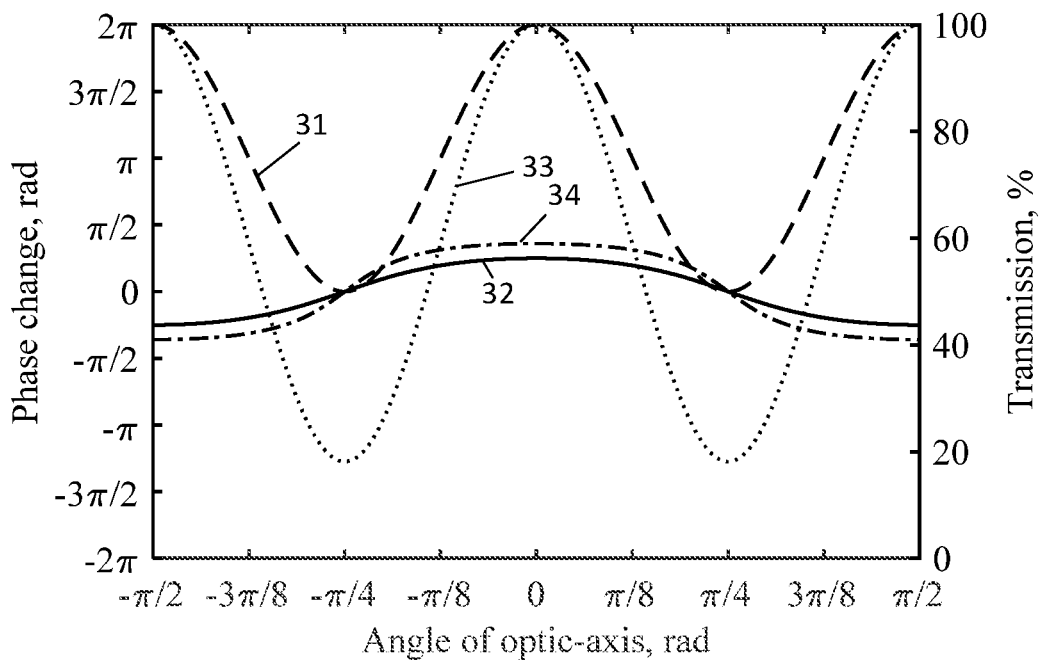
FIG. 3 shows simulated phase modulation and amplitude modulation obtained for a device according to FIG. 2a (showing that phase modulation is accompanied by a large amount of amplitude modulation)

FIG. 3 illustrates a problem with the configuration of FIG. 2a, in that modulation of phase is accompanied by modulation of amplitude. Simulated amplitude modulation 31 and phase modulation 32 with varying tilt angle is shown for a device in which the LC layer 15 has a retardance of $0.375\lambda$ ($0.75\pi$ rad), along with simulated amplitude modulation 33 and phase modulation 34 with varying tilt angle for a device in which the LC layer 15 has a retardance of $0.32\lambda$ ($0.64\pi$ rad).

In the case of a retardance of $0.375\lambda$, there is only $0.5\pi$ phase modulation, which is well below the $2\pi$ required for many applications. In addition, with this retardance there is 50% amplitude variation, which is undesirable. Reducing the $\lambda$ to $0.32\lambda$ has the effect of increasing the phase modulation to $0.72\pi$. However, this also increases the amplitude modulation to 81.9%. In the limit of reducing the retardance to $0.25\lambda$, there will be a sharp step change of $\lambda$ phase modulation, tending towards zero transmission at $\lambda$ phase modulation. Therefore, this configuration is not useful. Note: The x-axis in FIG. 3 represents the absolute angle of the optic-axis. In reality, it will not be possible to vary the optic axis angle over a $2\pi$ range. Instead, the device (under zero field) will be rotated to either $-\pi/4$ or $+\pi/4$ and the actual tilt variation will be around $\pm\pi/4$.

FIG. 2b shows a phase modulator according to an embodiment, in which a circular polariser, comprising a linear polariser 7 and a quarter wave plate 13, is configured to impart circular polarisation to the incoming light 16 before it reaches the liquid crystal layer 15. The LC layer 15 is a flexoelectro-optic chiral nematic layer that is birefringent with a retardance of approximate $\lambda/4$ ($\pi/2$ rad), and an optic axis in the plane of the device that tilts in the plane in response to an electric field. A voltage source 3 is provided for imparting the electric field (via electrodes, which are omitted for clarity). In the device of FIG. 2b, circular polarised light is turned into linearly polarised light by the LC layer 15. After reflection this linearly polarised light is turned back into circularly polarised light by the LC layer 15 before the quarter wave plate 13. The quarter wave plate 13 returns the light to linear polarisation with the appropriate polarisation orientation for transmission through the linear polariser 7. Changing the tilt angle $\varphi_t$ will adjust the angle between the orientation of the linear polariser 7 and the optic axis 6 of the LC layer 15, which will modulate the phase without modulating amplitude. The phase change imparted by the liquid crystal layer 15 will be equal to twice the angle between the polarisation orientation of the linear polariser 7 and the optic axis.

Figure 4:
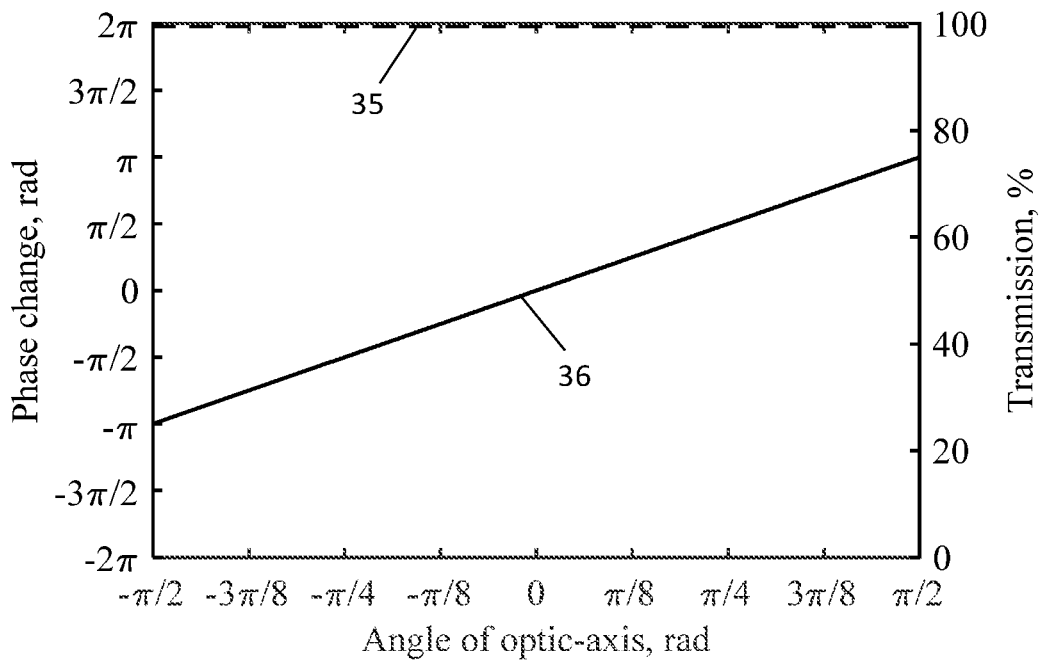
FIG. 4 shows simulated phase modulation and amplitude modulation obtained for a device according to FIG. 2b (showing that phase modulation changes linearly with optic axis tilt, and that amplitude is not modulated)

FIG. 4 shows simulated amplitude modulation 35 and phase modulation 36 with varying tilt angle for a device according to FIG. 2b. The simulation assumes that there is a 5% error (from the desired value of $\lambda/4$). A small fixed loss is introduced by this error, but importantly the loss is not modulated with phase—it remains fixed with varying tilt angle. For a realistic tilt angle variation of $\pm\pi/4$, the maximum phase modulation range is $\pi$, which is less than the $2\pi$ that is ideally required. This configuration is, however, a significant improvement over prior art spatial light modulators.

FIG. 5a shows a device comprising a linear polariser 7, first quarter wave plate 13, LC layer 15, second quarter wave plate 23 and reflector 8. Input light 16 passes through the linear polariser 7, then through the quarter wave plate 13, after which it will be circularly polarised (the polariser 7 and quarter wave plate 13 together forming a circular polariser). A circular polariser can also be purchased as a single integrated device. The circular polarised light passes through the LC layer 15, which shifts the phase of the light by an amount that is proportional to the angle of the tilt axis.

In this embodiment the LC layer 15 is arranged with a retardance of $\lambda/2$ ($\lambda$ rad), with the result that light leaving the LC layer 15 after the first pass through is circularly polarised with the opposite handedness to the light that was incident on the LC layer 15 from the first quarter wave plate 13. This circular polarised light passes through the second quarter waveplate 23 twice as it is reflected from the reflector 8 (on the way to and from the reflector 8). The second quarter waveplate 23 and the reflector 8 together form a handedness preserving mirror: the light re-entering the LC layer 15 from the reflector 8 (for the second pass through the LC layer 15) has the same handedness as the light that emerged from the LC layer 15 on the first pass. Therefore the light re-entering the LC layer on the second pass has the opposite handedness to the light which entered the LC layer 15 from the first waveplate 13 (in the first pass). However, the optic axis of the LC layer 15 when viewed from the reverse direction is different to that of the forward direction (it is mirrored). Without this preservation of handedness of the circular polarisation, the phase modulation from the first pass through the LC layer 15 would be cancelled by the second pass. With the second quarter wave reflector 23 (preserving handedness), the second pass through the LC layer 15 doubles the phase modulation that resulted from the first pass.

In more theoretical terms, the output optical field $E_0$ for the configuration shown in FIG. 5*a* can be calculated from:

$$E_0 = PQ_1\left(-\frac{\pi}{4}\right)D(-\varphi)Q_2\left(-\frac{\pi}{4}\right)MQ_2\left(\frac{\pi}{4}\right)D(\varphi)Q_1\left(\frac{\pi}{4}\right)E_i$$

where $D(\varphi)$ is the Jones matrix of an LC device having retardance $\delta$ at an orientation of angle $\varphi$ to the horizontal, $$Q_1\left(\frac{\pi}{4}\right) \text{ and } Q_2\left(\frac{\pi}{4}\right)$$

are the Jones matrices for quarter-wave plates at $$\frac{\pi}{4}$$

to the horizontal, M is the Jones matrix of a mirror, $E_i$ is the Jones matrix for horizontally polarised light and P is a horizontally aligned linear polariser.

FIG. 5*b* shows a configuration that is similar to that of FIG. 5*a*, but in which a chiral nematic LC reflector 24 is used instead of the second quarter-wave plate 23 and reflector 8. The reflector 24 has a helix axis which is perpendicular to the direction of propagation of the light 16. The reflector 24 reflects one handedness of light, but the other handedness passes straight through. The handedness which is reflected retains this same handedness (i.e. the reflector 24 can be considered a handedness preserving mirror). Optically, this device will have very similar performance to the device of FIG. 5*a*.

It should be pointed out that the use of a flexoelectro-optic material for the LC layer 15 has a number of advantages over alternatives such as chiral smectic devices:

(i) It exhibits very fast switching times (e.g. 100 μs is readily achievable).
(ii) It is not bistable, has no hysteresis and it is suitable for analogue modulation;
(iii) The retardance change with applied field is very small (e.g. 0.07 rad measured by the applicant for CBC7CB being switched through tilt-angles of ±pi/4). Any retardance change with field manifests as an amplitude modulation. Thus flexoelectro-optic devices will have very low amplitude modulation.
(iv) A wide range of flexoelectro-optic materials is readily available.

Figure 6:
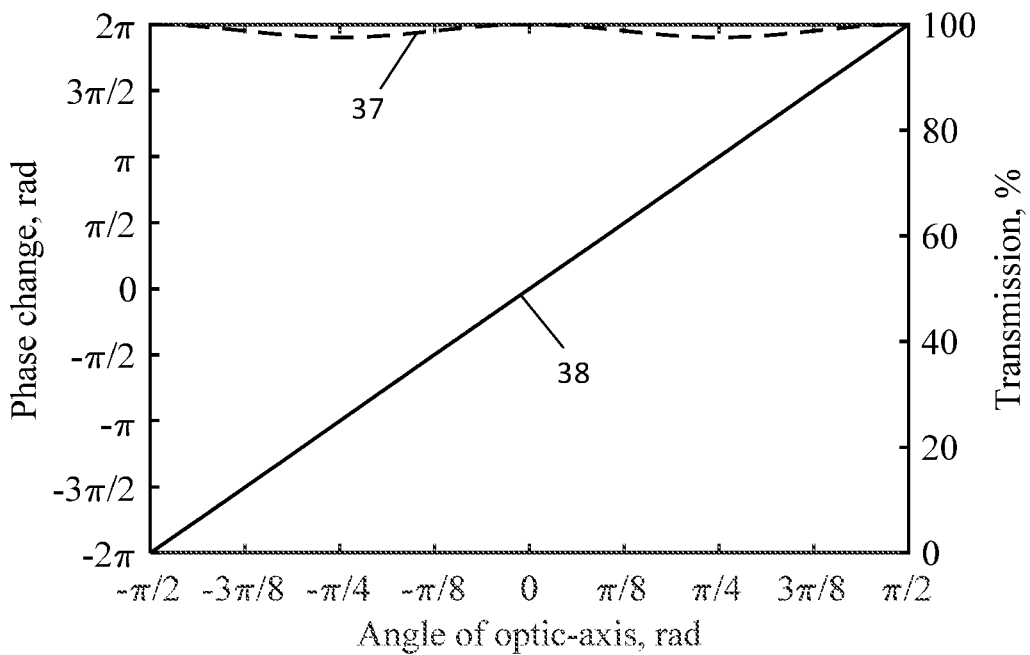
FIG. 6 shows simulated phase modulation and amplitude modulation obtained for a device according to FIG. 5a with a nominal retardance error for the liquid crystal layer of 5% (showing a $2\pi$ range of phase adjustment for a $\pi/2$ range of adjustment of the tilt angle, and a small amount of accompanying amplitude modulation as a result of the retardance error)

FIG. 6 shows the amplitude modulation 37 and phase modulation 38 with respect to tilt angle for the configuration of FIG. 5*a*, with a nominal retardance error for the LC layer 15 of 5%. For a practically-realisable tilt-angle variation of ±π/4, the maximum phase modulation range is 2π, allowing any phase value to be accessed. The phase is also very linear over the full tilt-angle range. A further advantage is that there is no pre-biasing of the zero-field orientation of the LC optic axis. The error in retardance results in a small amplitude modulation of around 2.4%.

Figure 7:
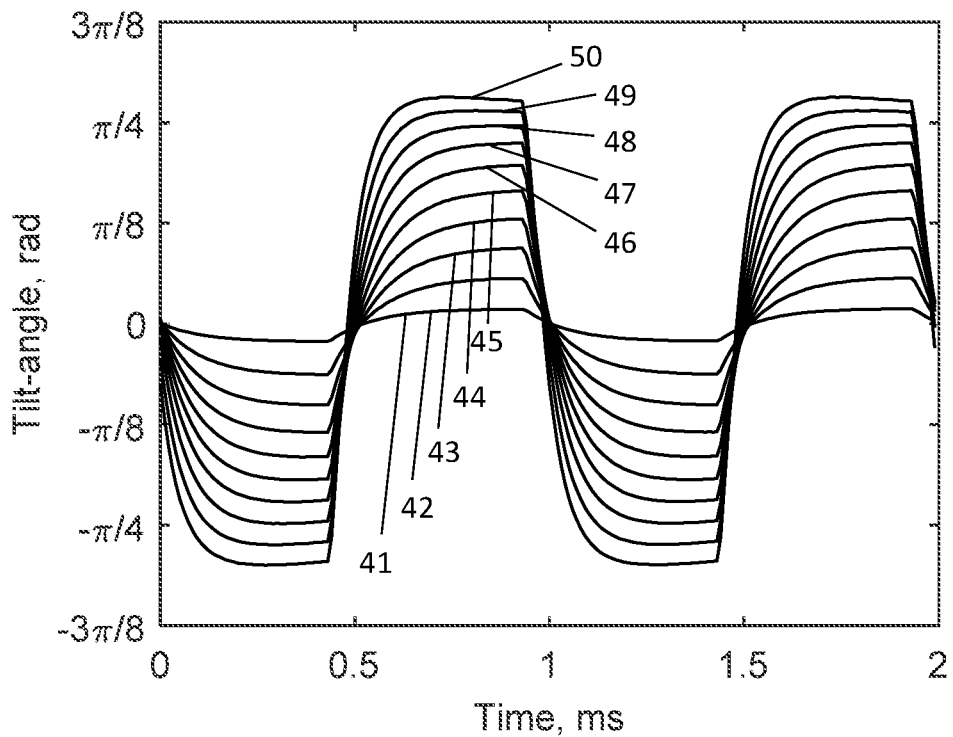

FIG. 7 shows measurement results for an example embodiment in which the LC layer 15 comprises LC mixture CBC7CB with 3 wt % chiral dopant. The molecules of the LC layer 15 were aligned in the ULH mode by cooling from the isotropic phase in an applied electric field and applying pressure to the device. The mixture was measured in a cell in transmission using a technique described in Fells et al. [16]. A 1 kHz square wave was applied to the LC layer 15 with a range of voltages. The results in FIG. 7 show how the angle of the optic axis varies with time, with curves 41 to 50 respectively corresponding with applied voltages of ±1V to ±10V. Significantly, tilt angles >π/4 and <−π/4 were achieved. It is also possible to set the tilt angle to be at any intermediate angle. The measurements also show that the device switches very fast, allowing 1 kHz frame rates.

Figure 8:
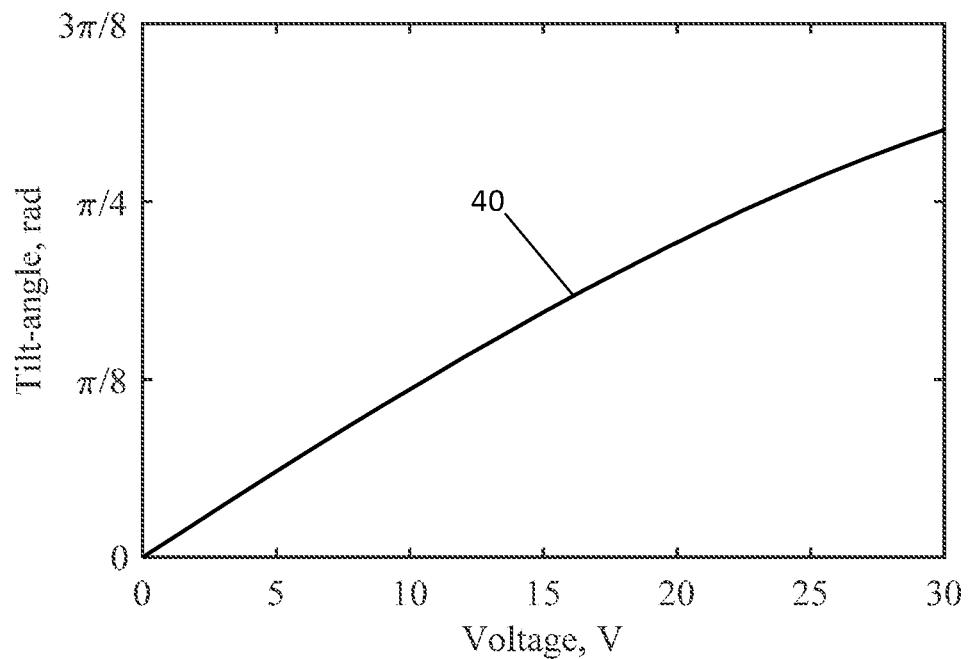
FIG. 8 shows measured tilt angle with respect to applied voltage obtained from the data shown in FIG. 7.

FIG. 8 shows the tilt-angle plotted against voltage 40, obtained from the data in FIG. 7. This shows that the tilt angle varies approximately linearly with voltage up to tilt angles of ±π/4.

Figure 9:
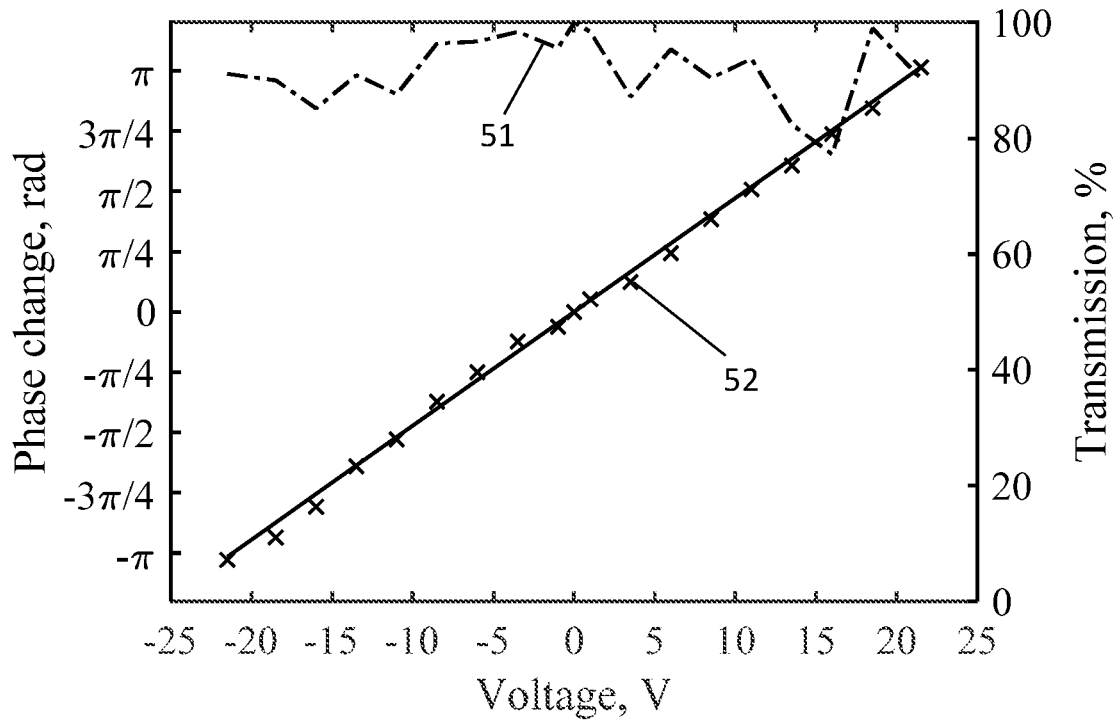

FIG. 9 shows measurements of phase modulation 52 and amplitude modulation 51 (both with respect to applied voltage) for a device according to FIG. 5*a*. The measurements were obtained using a Michelson interferometer. These results show the device gives very linear phase modulation with voltage, and low amplitude modulation of 22.8%. However, this variation is predominantly due to experimental error rather than fundamental amplitude modulation of the device as evidenced by the random nature of variation. This good performance is a consequence of the results shown in FIG. 6 (showing that the phase modulation is linear with the angle of the optic axis) and also FIG. 8 (showing that the tilt-angle and hence angle of optic axis is approximately linear with voltage). This is in stark contrast to the nonlinear phase response and large amplitude modulation shown in FIG. 3 for prior art devices, which, if they are configured to produce a useful range of phase modulation, will also inherently produce considerable amplitude modulation.

Figure 10:
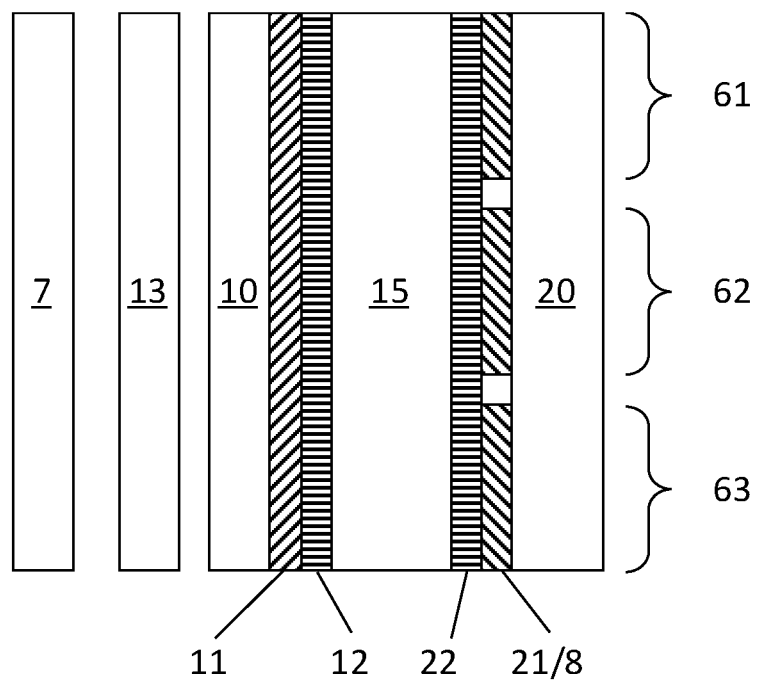
FIG. 10 is a schematic cross-sectional diagram of a device in accordance with FIG. 2b.

FIG. 10 shows an example of an integrated version of the configuration in FIG. 5*a* (not to scale). The device comprises (in order) a linear polariser 7, quarter waveplate 13, glass first substrate 10 with a first transparent electrode 11 (e.g. comprising ITO) and first polyimide alignment layer 12, LC layer 15, a second substrate 20 that is a CMOS silicon backplane and which includes reflective second electrodes 21/8 (e.g. comprising aluminium) for each pixel and a second polyimide alignment layer 22. The transparent electrode 11 may be grounded, so that a voltage applied to each second electrode 21 (i.e. corresponding with each pixel 61, 62, 63) will produce a field across the respective pixel 61-63, allowing selective modulation of phase over the different pixels (i.e. a spatial light modulator).

In this embodiment the LC layer 15 has a nominal retardance of λ/4 (as discussed with reference to FIG. 5*a*). The first substrate 10 may be bonded to the second substrate 20 to form an integrated cell, with spacers arranged to define the gap for the LC layer 15. The quarter wave plate 13 and polariser 7 may be co-packaged with the integrated cell.

Figure 11:
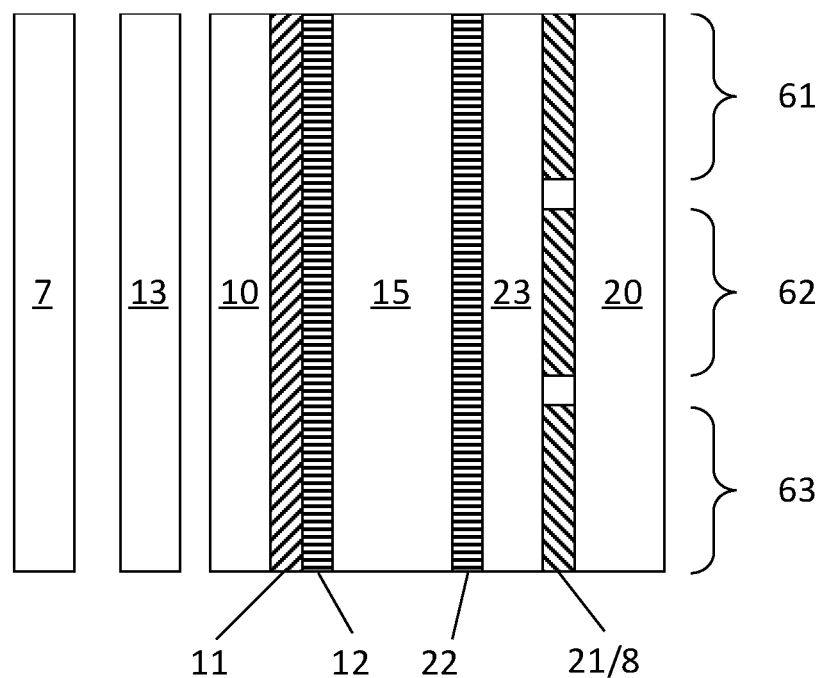

FIG. 11 shows an example of an integrated version of the configuration in FIG. 5*a*. The device is like that shown in FIG. 10, but the waveplate 13 between the polariser 7 and first substrate is a first waveplate 13, and a second waveplate 23 is included in the integrated cell between the second electrodes 21 and the second alignment layer 22. In this embodiment the LC layer 15 has a nominal retardance of λ/2 (as discussed with reference to FIG. 5a).

Figure 12:
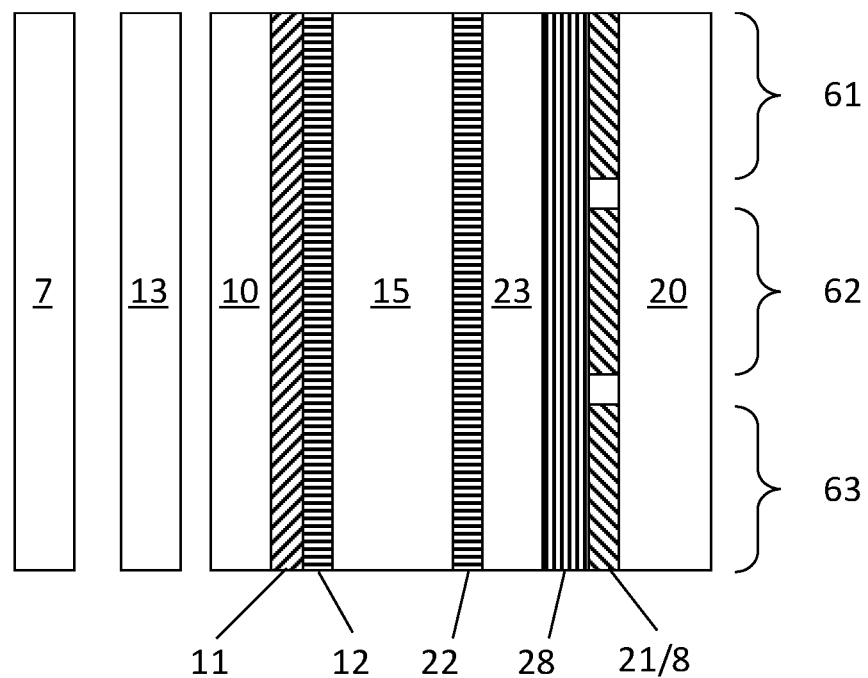
FIG. 12 is a schematic cross-sectional diagram of a device in accordance with FIG. 5a, in which a dielectric mirror is used to reflect light back through the liquid crystal layer.

FIG. 12 shows an example of an integrated version of the configuration in FIG. 5a. The device is like that shown in FIG. 11, but a dielectric reflector 28 has been included in the integrated cell, disposed between the second electrode 21 and the second quarter waveplate 23. The dielectric reflector 28 may comprise a quarter wavelength stack at the wavelength of the light to be modulated, or a broad-band dielectric mirror. The dielectric mirror 28 may provide better reflectivity than an aluminium electrode.

Figure 13:
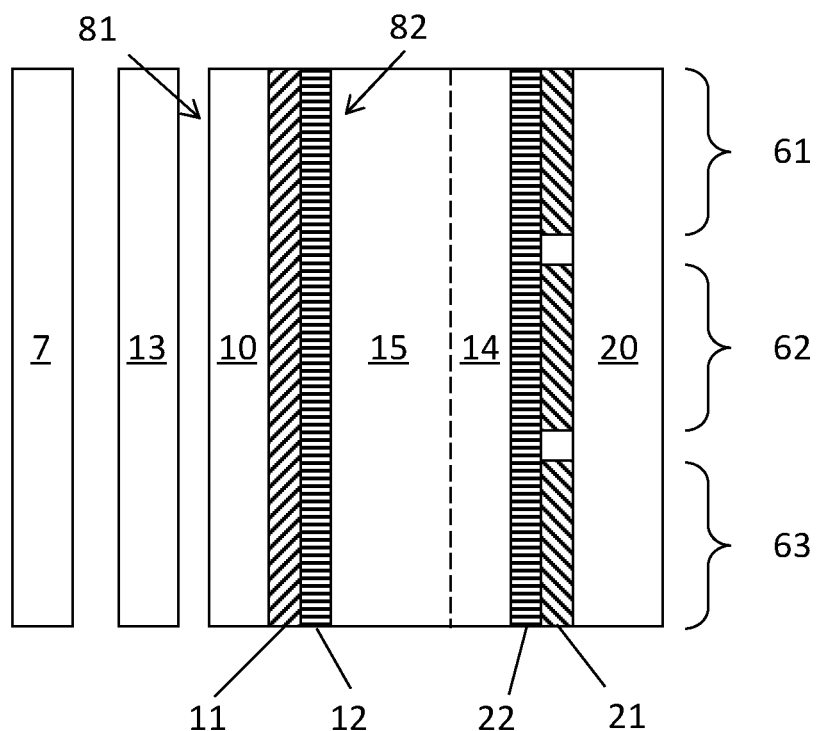
FIG. 13 is a schematic cross-sectional diagram of a device in accordance with FIG. 5a in which a fixed liquid crystal layer is configured to act as a quarter wave plate.

FIG. 13 shows an example of an integrated version of the configuration in FIG. 5a. This embodiment functions in a similar way to the embodiment of FIG. 11, but with a significant difference: in this embodiment the liquid crystal between the first and second substrates 10, 20 is partitioned into a fixed LC layer 14 which is unresponsive to electric field (or at least is much less responsive), and a responsive LC layer 15 which is birefringent with an optic axis that tilts in response to electric field. The fixed LC layer 14 is configured as a quarter waveplate, and the retardance of the responsive quarter waveplate 15 is λ/2. The same polymerisable LC composition may be used for both the fixed and responsive LC layers 14, 15, and the fixed LC layer 14 may be polymerised. As will be explained more fully below, the fixed and responsive LC layers 14, 15 need not comprise the same composition, and there are several ways of realising such a device.

Figure 14A:
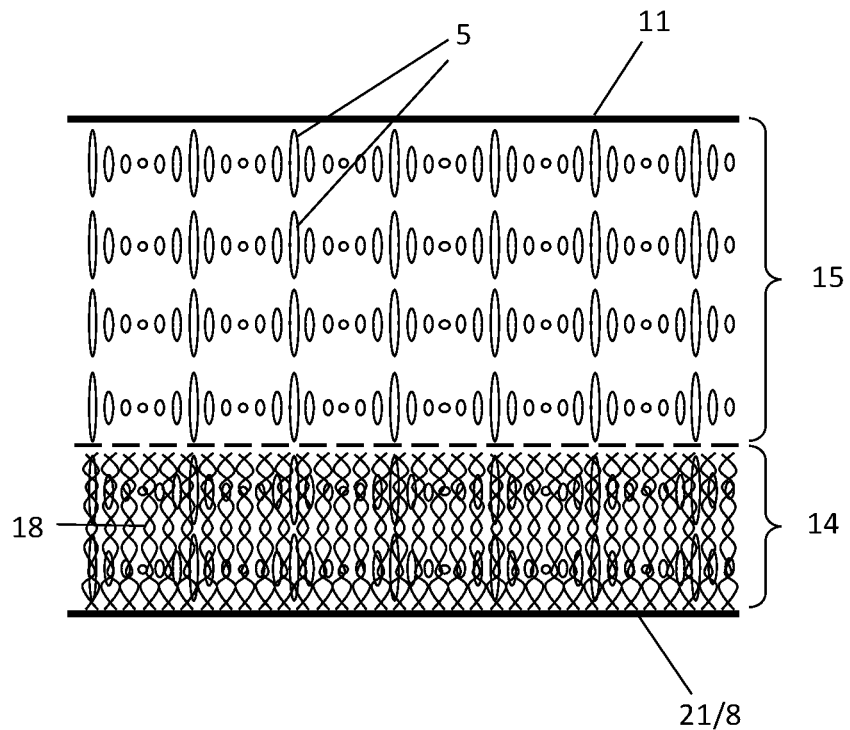
FIG. 14a is a schematic cross-section of liquid crystal layers between a first and second electrode, showing a polymerised ULH fixed layer adjacent to the second (lower) electrode and a responsive ULH liquid crystal layer adjacent to the first (upper) electrode.

FIG. 14a shows a diagrammatic representation of the partitioned LC in FIG. 13. There is a polymer network 18 constraining tilting of the optic axis in the fixed LC layer 14 such that the optic axis in this region remains substantially fixed, even in the presence of an applied field. However, the unpolymerised LC layer 15 is unconstrained and so the optic axis tilts with applied field. The responsive LC layer 15 is approximately twice the thickness of the fixed LC layer 14 (because the fixed LC layer 15 is configured with a retardance of λ/2 and the responsive LC layer 14 is configured with a retardance of λ/4).

Figure 14B:
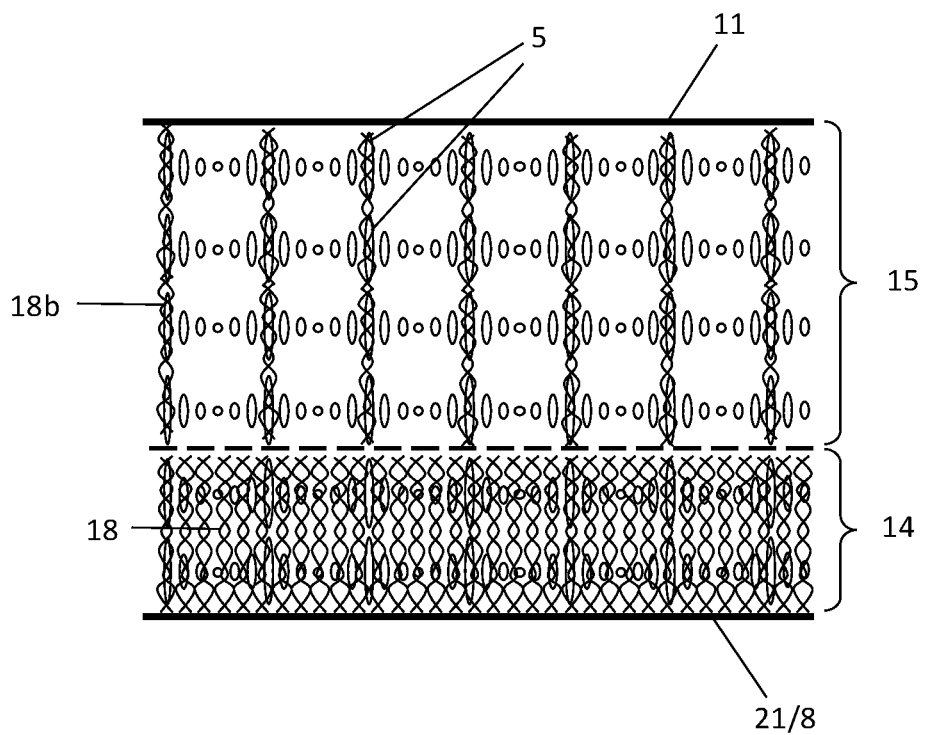
FIG. 14b is a schematic cross-section of liquid crystal layers between a first and second electrode, showing a polymerised ULH fixed layer adjacent to the second (lower) electrode and a responsive ULH liquid crystal layer adjacent to the first (upper) electrode which has polymer pillars to hold the ULH structure in place, whilst allowing the optic-axis angle to tilt under applied field.

FIG. 14b shows an alternative diagrammatic representation of the partitioned LC in FIG. 13. There is a polymer network 18 constraining tilting of the optic axis in the constrained LC layer 14 such that the optic axis in this region remains substantially fixed, even in the presence of an applied field. There is also a polymer network in the responsive layer 15, forming the remaining part of the LC. The responsive layer 15 has a much lower level of polymerisation. For example, polymer pillars 18b may be used to stabilise the ULH mode, but still allow the tilt-angle to change under applied field. There may be some reduction in the amount of tilt-angle change with applied field, but this may be outweighed by the benefit of the ULH mode remaining stable. Equally the constrained LC layer 14 may have some residual tilt-angle change with applied field. There is a difference between the magnitude of the tilt angle with field between the two layers.

Figure 15:
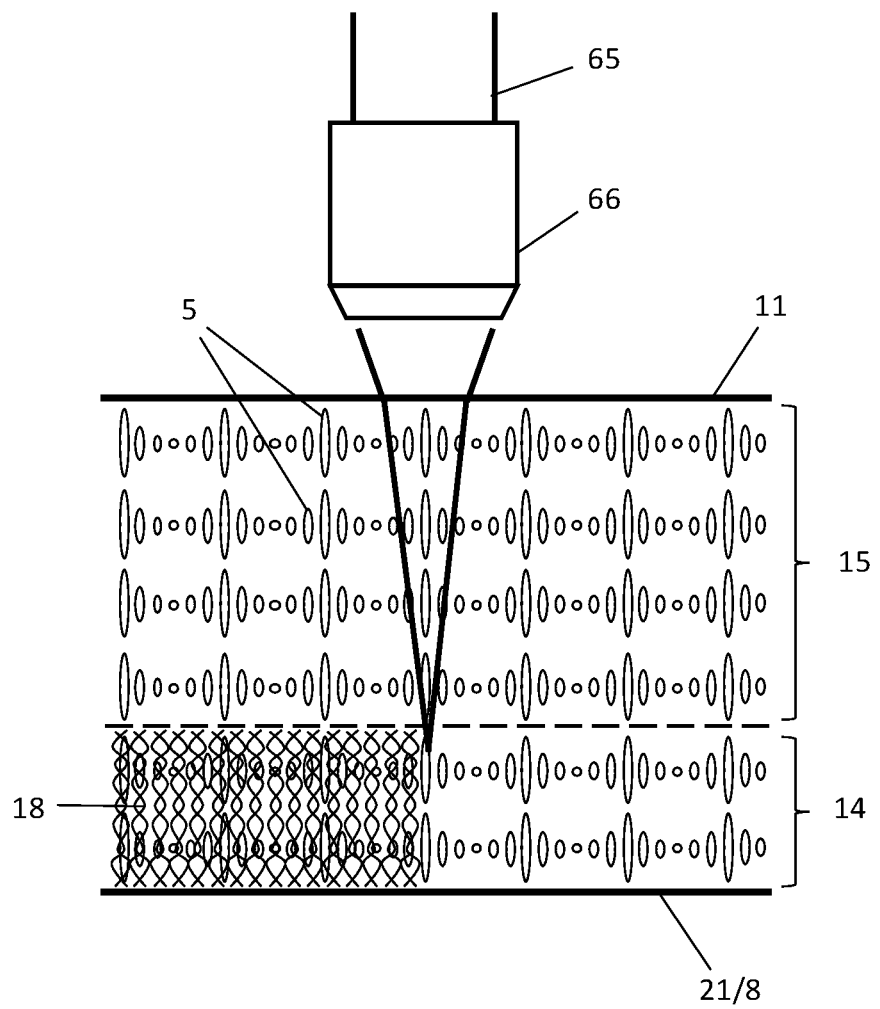
FIG. 15 is an illustration of polymerisation of a region of a liquid crystal material to define a fixed liquid crystal layer.

FIG. 15 shows a method of fabricating the partitioned LC of FIG. 14a or FIG. 14b. The steps are as follows:
  i) the cell is constructed from the first and second substrate (e.g. silicon backplane, glass cover), together with first and second electrodes 11, 21 and first and second alignment layers;
  ii) the cell is filled with (for example) 70 wt % liquid crystal mixture (e.g. CBC7CB or a derivative with 3 wt % chiral dopant such as BDH1281), a reactive mesogen (e.g. RM257) and photo-initiator (e.g. irgacure 819 or 369);
  iii) an electric field is applied across the cell using the cell electrodes, the cell is heated above the clearing temperature and allowed it to cool to form a ULH alignment; if necessary pressure is applied to the cell.
  iv) a laser is used to polymerise the reactive mesogen by focusing to a point in the material, (for example by focusing a beam 65 through the first substrate, using an objective lens 66). As an example, the laser may have a wavelength of 790 nm and pulse widths of ~100 fs. This results in a two-photon absorption effect which results in UV light of very high intensity. The laser may be used to target localised regions within the LC mixture within the third of the LC thickness closest to the second electrode 21. The proportion of polymer and photo-initiator may be carefully controlled so that polymerisation only take place in the presence of the high energy laser pulses and does not occur in daylight or artificial ambient light. Alternatively, after this process the unpolymerised LC material may be washed out and replaced with new LC material that has chiral dopant (i.e. suitable for forming a ULH chiral nematic phase), but which does not have the reactive mesogen and/or the photo-initiator.
  v) optionally, the laser may be used to polymerise the two thirds of the material closest to the first electrode, but to a lesser extent. For example, polymer pillars can be fabricated.

The air, first substrate and liquid crystal will all typically have different refractive indices. As the beam 65 passes through the interfaces between these materials, aberration will result in a defocusing of the beam. To compensate for this, the beam 65 can be pre-distorted with an active optical element such as an SLM (e.g. as per the system of FIG. 22).

Figure 16:
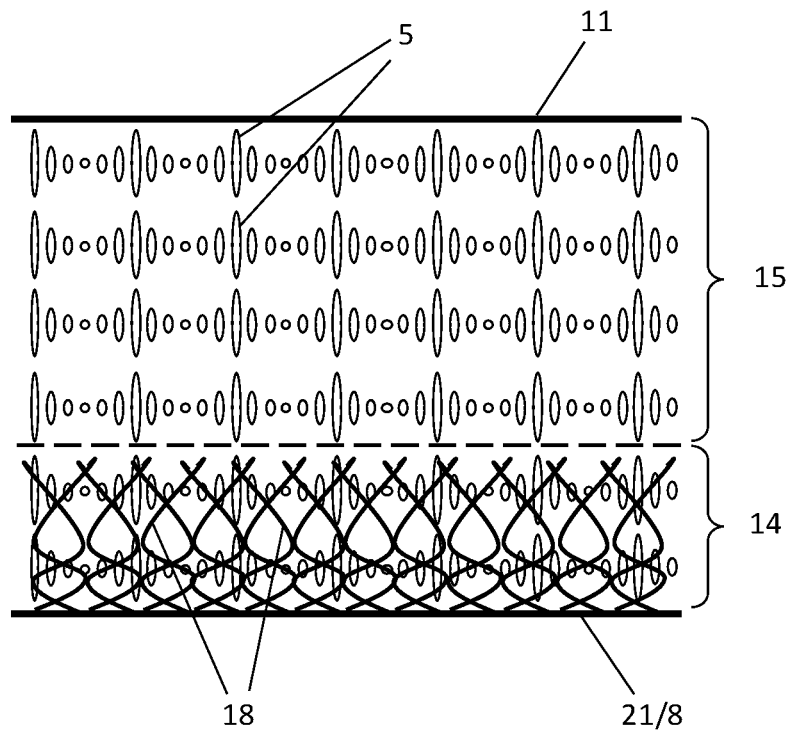
FIG. 16 is a further schematic cross-section of liquid crystal layers between a first and second electrode, showing a polymerised ULH fixed layer adjacent to the second (lower) electrode and a responsive ULH liquid crystal layer adjacent to the first (upper) electrode.

FIG. 16 shows an alternative representation of a partitioned LC. There is a polymer network 18 constraining the tilting of the optic axis in a fixed layer 14. This may be fabricated by performing the following steps:
  i) fill a transparent cell (e.g glass) with monomers, photo-initiator and the LC mixture;
  ii) illuminate the first transparent cell from one side to cure the polymer 18 in one third of the thickness of cell to form the fixed LC layer 14; the UV intensity and duration is controlled such that polymerisation only occurs for a fixed depth;
  iii) remove the substrate on which the polymer film 14 has formed;
  iv) wash off the unpolymerised LC material;
  v) bond the substrate carrying the polymer film 14 to a silicon backplane (with electrodes 21 on top) to define a device cell;
  vi) refill the device cell with an LC mixture to form the responsive LC layer 15.

FIG. 17 shows a partitioned LC device in which the responsive LC layer 15 comprises a ULH LC and the fixed LC layer 14 comprises a chiral nematic reflector. The chiral nematic reflector has a helix axis which is orientated along the axis of the light path (i.e. normal to the plane of the device). The chiral nematic LC in the fixed LC layer 14 is polymerised into a film and disposed on top of the reflective (second) electrode 21. The chiral nematic reflector is a distributed reflector, reflecting light which corresponds to the pitch of the helix. It should be noted that unlike the previous examples, the thickness of the fixed layer does not have to be such as to give a retardance of λ/4.

FIG. 18 shows an example of an integrated version of the configuration in FIG. 5a. This embodiment functions in a similar way to the embodiment of FIG. 13, but the second alignment layer 22 is configured as the second quarter wave plate 23 (i.e. the second alignment layer is made of a birefringent material with a thickness chosen to give a retardance of λ/4. The second alignment layer 22 therefore performs two functions, thus reducing the number of layers. This may make the device more manufacturable. It may also reduce the thickness of material between the first and second electrodes and therefore reduce the voltage required to achieve the required field.

FIG. 19a shows a device comprising a two-dimensional array of pixels 61, 62, 63 (not all the pixels are labelled for clarity). The second substrate 20 in this example is a silicon backplane, which may include circuits for controlling each pixel 61-63 in response to instructions transmitted to the device via an electrical interface 25. Each pixel 61-63 may be individually addressed, such that each pixel 61-63 imparts a different phase on the reflected light according to the field applied. This enables the wavefront of a beam to be controlled/distorted. This diagram is a schematic illustration only—there may be many more pixels (e.g. 128×128, 1024× 1024 or 1920×1080).

FIG. 19b is a schematic diagram of a controller for the device of FIG. 19a, which may be implemented, at least in part, in circuitry formed in or attached to the second substrate (or co-packed with the device). The electrical interface 19 may comprise a standard interface connector (e.g. DVI). The phase required for each pixel 61-63 may be determined from signals received via this interface 19. A calibration module 29 (implemented in hardware and/or software) translates the phase required into a particular voltage level for that pixel (e.g. based on a lookup table that relates a particular voltage to a particular phase modulation). The calibration module 29 may take into account the nonlinearity of the tilt-angle versus voltage, nonuniformity of thickness affecting the field vs voltage, as well as other non-idealities. The calibration may be determined on a pixel-by-pixel basis or it may be the same for all pixels. Addressing circuitry 27 is provided to route the required voltage to a driver 26a-c for each pixel. Each electrode 21a-c then has a voltage applied via its own driver 26a-c. The drivers 26a-c may be high voltage drivers (e.g. able to apply voltages of at least 10V or at least 100V).

FIGS. 20a and 20b show two configurations which are transmissive, rather than reflective. The embodiment of FIG. 20a comprises (in the order that the incoming light 16 passes through) a linear polariser 7, first quarter waveplate 13a, first responsive LC layer 15a, half wave plate 9, second responsive LC layer 15b and a second quarter wave plate 13b. Each of the LC layers 15a, 15b are configured with a retardance of λ/2, and both LC layers tilt their optic axis with the same magnitude and direction with an applied field, which is applied with the same polarity to each LC layer 15a, 15b. Note, rather than apply an electric field to the LC layers 15a, 15b separately, the field could alternatively be applied across the LC layer 15a, λ/2 plate 9 and LC layer 15b as a whole.

Because the first LC layer 15a will change the handedness of the circularly polarised light, a half-wave plate 9 is placed between the two responsive LC layers 15a, 15b, to change the handedness. Hence the handedness of light entering both LC layers 15a, 15b is the same and their phase modulation is additive.

The configurations of FIGS. 20a and 20b may be formed by assembling two cells, each comprising a first and second substrate with a responsive liquid crystal layer therebetween, and each substrate comprising an electrode and an alignment layer.

In the configuration of FIG. 20b, the polarity of the electric field applied to the second LC layer 15b is opposite to the polarity applied to the first LC layer 15a, so that the optic axis of the second LC layer 15b rotates in the opposite sense to the first LC layer 15a (assuming the same physical orientation of the LC helix 2 for both layers 15a, 15b). As a result, a half-wave plate is not needed to change the handedness.

FIG. 21 shows an integrated transmissive device in which a single cell is provided with a first and second responsive LC layer 15a, 15b. Both the first and second LC layers 15a, 15b have a chiral nematic structure in the ULH mode. However, the first LC layer 15a is doped with a left-handed chiral dopant and the second LC layer 15b is doped with a right-handed chiral dopant. The two layers 15a, 15b may be separated by a polymer wall (that may be formed from polymerised LC material, as already discussed above), or any other transparent barrier. In response to an applied field, the optic-axis of the two layers 15a, 15b will rotate in opposite directions. The operation is therefore similar to that described for FIG. 20.

FIG. 22 shows an optical system incorporating a SLM 100 according to an embodiment. A beam from a light source 30 (e.g. a laser) is reflected off the SLM 100 and imaged onto a sample 53, for example for micromachining of the sample 53. A phase pattern is imparted on the optical beam by the SLM 100 to pre-distort the optical wavefront of the optical beam to correct for optical aberrations focusing into the sample. A pair of lenses 39 with an aperture 57 therebetween and an objective lens 66 is provided to focus the corrected beam into the sample 53. A controller 54 is used to generate and apply a phase signal to the SLM 100. It is also possible to incorporate a feedback system which monitors the beam on or in the sample 53 in order to adjust the spatial phase modulation requested from the SLM.

FIG. 23 shows two SLMs 100a, 100b concatenated together to make a polarisation independent spatial light modulator. The incoming light 16 is first split using a non-polarising beamsplitter (NPBS) 55. The light then enters a polarising beamsplitter (PBS) 56. The horizontally polarised light is reflected from a first SLM 100a according to an embodiment, and the vertically polarised light is reflected off a second SLM 100b according to an embodiment. The reflected light is then combined at the PBS 56. The NPSB 55 extracts the reflected beam 17. It is not necessary to have the first SLM 100a aligned onto matching pixels on the second SLM 100b. In practise, the phase pattern applied to the individual pixels can be adjusted in software, so that the pixels are matched relative to the beam (i.e. the pattern can be shifted in software, mitigating the need to precisely align the first SLM 100a with the second SLM 100b).

FIGS. 24a and 24b illustrate a potentially deleterious effect that sometimes occurs. Sometimes there is an offset in the mean tilt-angle, which varies depending on the magnitude of the bipolar signal that is applied to the first and second electrodes. FIG. 24a show the voltage applied, with a first set phase 71 and a second set phase 72. The first set phase 71 has a relatively low amplitude voltage signal, and the second set phase 72 has a higher voltage signal. FIG. 24b shows the tilt angle resulting from the voltage show in FIG. 24a (which also translates into the phase modulation from a device). It can be seen that the tilt-angle does not precisely follow the voltage signal, but instead, there is an offset 79 in the mean angle at higher voltages. This can result in a phase modulation error if it not corrected—the actual phase for the second set phase may be incorrect.

FIGS. 25a and 25b respectively illustrate methods by which this potential problem can be mitigated. In some applications for an SLM (e.g. ultrafast laser applications), the phase only needs to be correct for a small duty cycle. For instance, an ultrafast laser might have a pulse width of ~100 fs and a repetition rate of 1 kHz. In FIG. 25a, each set phase pulse is overdriven at the leading edge, so that it reaches a maximum field 77 and then decays down to the set phase voltage value 71. This means that a high field is applied at least once every cycle. In FIG. 25b, high voltage pulses 78 are interleaved with each set phase pulse 71, 72.

The phase modulator has application as a discrete device on its own, rather than being part of an SLM. The SLM can be used for pre-distortion of optical beams. The SLM can also be used to post-correct for beams which have been distorted by a sample or other mechanism. There are many systems in which the SLM or phase modulator can be used: for example laser micromachining, laser microscopy, beam-steering subsystems, light detection and ranging (LiDAR) systems, holographic displays, communications systems, autonomous vehicles, driver assistance systems and laser scanning systems.

Although specific embodiments have been described, it will be appreciated that other modifications and variants are also possible within the scope of the invention, and the invention is not limited by the above examples.

REFERENCES

1. A. Jesacher, C. Maurer, A. Schwaighofer, S. Bernet, and M. Ritsch-Marte, Opt. Express 16, 2597 (2008).
2. T. J. Gould, D. Burke, J. Bewersdorf, and M. J. Booth, Opt. Express 20, 20998 (2012).
3. A. Jesacher and M. J. Booth, Opt. Express 18, 21090 (2010).
4. A. Gomez, K. Shi, C. Quintana, M. Sato, G. Faulkner, B. C. Thomsen, and D. O'Brien, IEEE Photonics Technol. Lett. 27, 367 (2015).
5. Z. Zhang, Z. You, and D. Chu, Light Sci. Appl. 3, 1 (2014).
6. J. E. Stockley, G. D. Sharp, S. A. Serati, and K. M. Johnson, Opt. Lett. 20, 2441 (1995).
7. Z. Feng and K. Ishikawa, Opt. Lett. 43, 251 (2018).
8. R. M. Hyman, A. Lorenz, and T. D. Wilkinson, Liq. Cryst. 43, 83 (2016).
9. J. S. Patel and R. B. Meyer, Phys. Rev. Lett. 58, 1538 (1987).
10. J. Chen, S. M. Morris, T. D. Wilkinson, J. P. Freeman, and H. J. Coles, Opt. Express 17, 7130 (2009).
11. J. J. Gil and B. Eusebio, Optik (Stuttg). 76, 67 (1987).
12. A. Varanytsia and L. Chien, "Giant Flexoelectro-optic Effect with Liquid Crystal Dimer CB7CB," Sci. Rep. 7, 41333 (2017).
13. G. Babakhanova, Z. Parsouzi, S. Paladugu, H. Wang, Y. A. Nastishin, S. V. Shiyanovskii, S. Sprunt, and O. D. Lavrentovich, Phys. Rev. E 96, 1 (2017).
14. B. I. Outram and S. J. Elston, EPL 99, 37007 (2012).
15. H. de Vries, Acta Crystallogr. 4, 219 (1951).
16. J. A. J. Fells, S. J. Elston, M. J. Booth, and S. M. Morris, Opt. Express 26, 331 (2018)

The invention claimed is:

1. A device for modulation of light, comprising:
a first substrate comprising a first electrode;
a second substrate positioned adjacent to the first substrate, the second substrate positioned to provide a gap between the first and second substrate, the second substrate comprising a second electrode;
a liquid crystal layer disposed in the gap, wherein the liquid crystal layer has a chiral nematic phase which is birefringent with an optic axis that tilts in response to an applied electric field between the first and second electrode;
a further liquid crystal layer disposed in the gap with an optic axis that responds differently than that of the liquid crystal layer to an applied electric field, wherein the further liquid crystal layer is configured such that reflected circularly polarized light retains its handedness.

2. The device of claim 1, wherein the further liquid crystal layer is a constrained liquid crystal layer that has an optic axis that is less responsive to an applied electric field than the liquid crystal layer.

3. The device of claim 2, wherein the constrained liquid crystal layer is a polymerised liquid crystal layer, or a liquid crystal polymer or a cholesteric liquid crystal.

4. The device of claim 2, wherein the constrained liquid crystal layer has a phase retardation of 70 to 110 degrees.

5. The device of claim 2, wherein the responsive liquid crystal layer is configured as a half wave plate with a nominal phase retardation of 180 degrees.

6. The device of claim 1, wherein the liquid crystal layer is a first responsive liquid crystal layer, and the further liquid crystal layer is a second responsive liquid crystal layer.

7. The device of claim 2, wherein constrained liquid crystal layer has a chiral nematic phase with a helix axis substantially perpendicular to the substrate.

8. The device of claim 1, configured to modulate the phase of the light in an analog manner, or with at least 6-bit resolution, over a range of at least $\pi$ radians.

9. The device of claim 8, wherein the range of phase modulation is accompanied by amplitude modulation of less than 20%.

10. The device of claim 2, comprising a reflector adjacent to the second substrate, wherein the constrained liquid crystal layer is between the responsive liquid crystal layer and the reflector.

11. The device of claim 10, wherein the second electrode is reflective and the reflector comprises the reflective second electrode.

12. The device of claim 1, wherein the further liquid crystal layer comprises a cholesteric reflector.

13. The device of claim 1, wherein the responsive liquid crystal layer has a helix axis in a plane substantially parallel to the substrates.

14. The device of claim 1, wherein the responsive liquid crystal layer is in the uniform lying helix mode.

15. The device of claim 1, wherein the first and second electrodes are respectively on inside surfaces of the first and second substrates and/or the first and second electrodes are configured to generate an electric field which is substantially perpendicular to a plane of the first and/or second substrate.

16. The device of claim 1, wherein the tilt of the responsive liquid crystal layer is in a plane parallel to the first and/or second substrate.

17. A spatial light modulator comprising an array of devices according to claim 1, configured for independent control of the modulation of each device in the array.

18. The spatial light modulator of claim 17, wherein the second substrate comprises an integrated electronic circuit configured for independently controlling the electric field applied to each device in the array.

19. The spatial light modulator of claim 17, wherein the first electrode is a common electrode, and each device in the array comprises an independent second electrode.

20. A system, comprising:
- a coherent light source;
- a spatial light modulator according to claim 17, configured to modify a wavefront of a beam from the coherent light source.

* * * * *